US012698659B2

(12) United States Patent (10) Patent No.: US 12,698,659 B2
Fan (45) Date of Patent: Aug. 4, 2026

(54) HINGES AND FOLDABLE DISPLAY DEVICES

(71) Applicant: WUHAN CHINA STAR OPTOELECTRONICS SEMICONDUCTOR DISPLAY TECHNOLOGY CO., LTD., Wuhan (CN)

(72) Inventor: Yu Fan, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 300 days.

(21) Appl. No.: 18/253,788

(22) PCT Filed: Mar. 24, 2023

(86) PCT No.: PCT/CN2023/083735
§ 371 (c)(1),
(2) Date: May 22, 2023

(87) PCT Pub. No.: WO2024/174324
PCT Pub. Date: Aug. 29, 2024

(65) Prior Publication Data
US 2024/0401387 A1 Dec. 5, 2024

(30) Foreign Application Priority Data
Feb. 23, 2023 (CN) .......................... 202310161416.0

(51) Int. Cl.
*E05D 3/18* (2006.01)
*G06F 1/16* (2006.01)

(52) U.S. Cl.
CPC ............. *E05D 3/18* (2013.01); *G06F 1/1616* (2013.01); *G06F 1/1652* (2013.01); *G06F 1/1681* (2013.01); *E05Y 2201/46* (2013.01); *E05Y 2201/474* (2013.01)

(58) Field of Classification Search
CPC .... G06F 1/1652; G06F 1/1681; G06F 1/1616; H04M 1/0268
See application file for complete search history.

(56) References Cited

U.S. PATENT DOCUMENTS 11,256,302 B2 * 2/2022 Holung ................ G06F 1/1616
11,408,214 B1 * 8/2022 Hsu ........................ H04M 1/022
12,032,417 B2 * 7/2024 Park ...................... H04M 1/022
2018/0335800 A1 * 11/2018 Kim ...................... G06F 1/1618

(Continued)

*Primary Examiner* — Emily M Morgan
(74) *Attorney, Agent, or Firm* — PV IP PC; Christopher S. Ruprecht; Wei Te Chung

(57) ABSTRACT

A hinge and a foldable display device are provided. The hinge includes a fixed trestle and a rotation mechanism. The rotation mechanism includes a linear slider rotationally connected to the fixed trestle and having a first magnetic area and a linear chute having a second magnetic area. During unfolding and folding processes of the hinge, the linear slider slides relative to the linear chute, magnetic forces are generated between first magnetic area and the second magnetic area, and the magnetic force acting on the first magnetic area has a direction changing from an opposite direction to a same direction of the sliding direction of the linear slider.

17 Claims, 10 Drawing Sheets

1

1

(56)     References Cited

U.S. PATENT DOCUMENTS

| 2019/0203512 A1* | 7/2019 | Lin ........................ G06F 1/1616 |
|---|---|---|
| 2020/0267858 A1* | 8/2020 | Kim ......................... E05D 3/02 |
| 2021/0267076 A1* | 8/2021 | Zhang ................. H05K 5/0226 |
| 2021/0267077 A1* | 8/2021 | Zhang ................. H05K 5/0221 |
| 2023/0004068 A1* | 1/2023 | Ishikawa ............. H04M 1/0264 |
| 2023/0297133 A1* | 9/2023 | Lee ........................ G06F 1/1683 |
| | | 361/679.02 |
| 2024/0121905 A1* | 4/2024 | Cao ......................... G09F 9/301 |
| 2024/0384750 A1* | 11/2024 | Jiang ....................... F16C 11/04 |
| 2024/0401387 A1* | 12/2024 | Fan ........................ G06F 1/1681 |

* cited by examiner

<u>1</u>

<u>1</u>

210

210

HINGES AND FOLDABLE DISPLAY DEVICES

CROSS-REFERENCE TO RELATED APPLICATION

This application is a national stage of International Application No. PCT/CN2023/083735, filed on Mar. 24, 2023, which claims priority to Chinese Patent Application No. 202310161416.0, filed on Feb. 23, 2023. The aforementioned applications are incorporated herein by reference in their entireties.

TECHNICAL FIELD

The present disclosure relates to the field of display technologies, and in particular, to hinges and foldable display devices.

BACKGROUND

With the development of flexible organic light emitting diode (OLED for short) display technologies, a wide variety of foldable terminal devices are starting to get into the market.

Generally, the foldable terminal devices are each unfolded and folded through a hinge. However, as an operation frequency of unfolding and folding the foldable terminal device increases, a structure (for example, a pair of cams) of the hinge configured to provide a main damping during a motion process becomes severely worn, resulting in loss of stability and service life of the hinge. A normal operation of the foldable terminal device is thus affected.

SUMMARY OF THE INVENTION

Technical Problems

Hinges and foldable display devices are provided according to the present disclosure. A magnetic force is configured to provide a damping effect during a motion process, an unfolding force at an unfolding moment, and a folding force at a folding moment to the hinge, so as to relieve wear degree of a structure of the hinge configured to provide a main damping during a motion process, thereby enhancing stability and service life of the hinge.

Technical Solutions

In a first aspect, a hinge is provided according to the present disclosure. The hinge includes a fixed trestle and a rotation mechanism; the rotation mechanism includes at least one linear sliding module, the linear sliding module includes a connection member and an installation member, the connection member includes a linear slider and an extension part extending along a direction from the linear slider to the fixed trestle, and the installation member is provided with a linear chute thereon, the linear slider is slidably connected to the linear chute, and the extension part is rotationally connected to the fixed trestle; and herein, the linear slider includes a first magnetic area with magnetism, the linear chute includes a second magnetic area with magnetism and disposed adjacent to the first magnetic area, and the first magnetic area and the second magnetic area have opposite pole directions; and herein, during an unfolding process and a folding process of the hinge, the linear slider is configured to linearly slide relative to the linear chute, the first magnetic area and the second magnetic area are configured to generate magnetic forces therebetween to interact on each other, the magnetic forces each have a direction configured to be parallel to a sliding direction of the linear slider, and one magnetic force of the magnetic forces acting on the first magnetic area has a direction configured to gradually change from a direction opposite to the sliding direction of the linear slider to a direction same with the sliding direction of the linear slider.

According to the hinge provided in the present disclosure, during a changing process of the hinge from a folded state to an unfolded state, the linear slider is configured to linearly slide relative to the linear chute along a direction away from the fixed trestle; and the changing process of the hinge from the folded state to the unfolded state includes a first unfolding phase and a second unfolding phase in sequence; and during the first unfolding phase, the magnetic force acting on the first magnetic area has a direction configured to be towards the fixed trestle; and during the second folding phase, the magnetic force acting on the first magnetic area has a direction configured to be away from the fixed trestle.

According to the hinge provided in the present disclosure, when the hinge is in the unfolded state, the magnetic force acting on the first magnetic area is configured to be zero in the sliding direction of the linear slider.

According to the hinge provided in the present disclosure, during a changing process of the hinge from the unfolded state to the folded state, the linear slider is configured to linearly slide relative to the linear chute along a direction towards the fixed trestle; and the changing process of the hinge from the unfolded state to the folded state includes a first folding phase and a second folding phase in sequence; and during the first folding phase, the magnetic force acting on the first magnetic area has a direction configured to be away from the fixed trestle; and during the second folding phase, the magnetic force acting on the first magnetic area has a direction configured to be towards the fixed trestle.

According to the hinge provided in the present disclosure, when the hinge is in the folded state, the magnetic force acting on the first magnetic area has a direction configured to be towards the fixed trestle.

According to the hinge provided in the present disclosure, the linear slider includes a sliding part connected to the extension part and a first magnetic member fixed on the sliding part; the linear chute includes a chute part disposed on the installation member and a second magnetic member fixed on the chute part; and the sliding part is slidably connected to the chute part; and the first magnetic member is disposed in the first magnetic area, the second magnetic member is disposed the second magnetic area, and the first magnetic member and the second magnetic member are configured to have opposite pole directions.

According to the hinge provided in the present disclosure, a distance between the first magnetic member and the second magnetic member is greater than zero.

According to the hinge provided in the present disclosure, the first magnetic member is fixed on a side of the sliding part away from the chute part in a direction perpendicular to the linear slider and the linear chute, and the second magnetic member is arranged along an extending direction of the chute part and is adjacent to the first magnetic member.

According to the hinge provided in the present disclosure, the first magnetic member includes a first bar magnet, the second magnetic member includes a second bar magnet and a third bar magnet symmetrically disposed on both sides of the chute part and having a same pole direction, and the first bar magnet, the second bar magnet, and the third bar magnet each have an extending direction same with the extending direction of the chute part.

According to the hinge provided in the present disclosure, a length of the first bar magnet is less than or equal to a length of the chute part, and a length of the second bar magnet and a length of the third bar magnet are equal to the length of the chute part.

According to the hinge provided in the present disclosure, when the hinge is in a folded state, a distance between an end of the first bar magnet away from the extension part and a magnetic pole interface of the second bar magnet and a distance between the end of the first bar magnet away from the extension part and a magnetic pole interface of the third bar magnet are configured to be greater than zero.

According to the hinge provided in the present disclosure, when the hinge is in an unfolded state, a magnetic pole interface of the first bar magnet, a magnetic pole interface of the second bar magnet, and a magnetic pole interface of the third bar magnet are configured to be in a same plane which is perpendicular to the extending direction of the chute part.

According to the hinge provided in the present disclosure, the chute part includes a first limiting chute, a second limiting chute, and a guiding chute; an opening of the first limiting chute and an opening of the second limiting chute are configured to face each other, and the guiding chute is located between the first limiting chute and the second limiting chute and is communicated with the first limiting chute and the second limiting chute; and the sliding part includes a sliding body located in the first limiting chute, the second limiting chute, and the guiding chute; and the first bar magnet is disposed on a side of the sliding body away from the guiding chute and corresponds to the guiding chute, the second bar magnet is disposed on an outer surface of a lateral wall of the first limiting chute, and the third bar magnet is disposed on an outer surface of a lateral wall of the second limiting chute.

According to the hinge provided in the present disclosure, the sliding part further includes a protrude part located on a side of the sliding body away from the guiding chute and corresponds to the guiding chute, and the first bar magnet is located on a side of the protrude part away from the sliding body.

According to the hinge provided in the present disclosure, the installation member further includes a first limiting plate located on an outer surface of a bottom wall of the first limiting chute and protruding along a direction perpendicular to the installation member and a second limiting plate located on an outer surface of a bottom wall of the second limiting chute and protruding along the direction perpendicular to the installation member, and an extending direction of the first limiting plate and an extending direction of the second limiting plate are same with an extending direction of the guiding chute; and a side of the second bar magnet away from the third bar magnet is in contact with the first limiting plate, and a side of the third bar magnet away from the second bar magnet is in contact with the second limiting plate.

According to the hinge provided in the present disclosure, a material of the linear slider includes a magnetic material, and a material of the linear chute includes a magnetic material; and the linear slider forms a first magnetic member located in the first magnetic area, the linear chute forms a second magnetic member located in the second magnetic area, and the first magnetic member and the second magnetic member are configured to have opposite pole directions.

According to the hinge provided in the present disclosure, the extension part includes a connection part and a rotation part, the connection part includes an end connected to the linear slider and another end connected to the rotation part, and the rotation part is rotationally connected to the fixed trestle through a shaft;

the hinge further includes a position mechanism, the position mechanism includes a position member and an elastic member each sleeved on the shaft, the elastic member includes an end connected to the position member and another end connected to the fixed trestle, and the position member is located between the elastic member and the rotation part; and an end of the rotation part adjacent to the position member is provided with a first cam, the position member includes a second cam abutting against with the first cam, and the first cam and the second cam are sleeved on the shaft.

According to the hinge provided in the present disclosure, when the hinge is in the folded state or the unfolded state, the elastic member is configured to be compressed, and the first cam and the second cam are configured to generate friction forces therebetween and interacting on each other; and when the hinge is in the folded state, the first cam and the second cam are configured to generate the friction forces therebetween to hold the hinge in the folded state, and the first magnetic area and the second magnetic area are configured to generate the magnetic forces therebetween to hold the hinge in the folded state; and when the hinge is in the unfolded state, the first cam and the second cam are configured to generate the friction forces therebetween to hold the hinge in the unfolded state, and the first magnetic area and the second magnetic area are configured to generate the magnetic forces therebetween to hold the hinge in the unfolded state.

According to the hinge provided in the present disclosure, during the changing process of the hinge from the unfolded state to the folded state or the changing process of the hinge from the folded state to the unfolded state, the elastic member is configured to be compressed, and the first cam and the second cam are configured to generate a friction force therebetween and having a direction opposite to a rotation direction of the first cam, so as to provide a motion damping to the hinge;

when the hinge is during the first folding phase and the first unfolding phase, the first magnetic area and the second magnetic area are configured to generate the magnetic forces therebetween and each having the direction opposite to the sliding direction of the linear slider, so as to provide the motion damping to the hinge.

In a second aspect, a foldable display device is further provided in the present disclosure. The foldable display device includes a flexible display panel and at least one hinge mentioned above; the at least one linear sliding module includes two linear sliding modules located respectively on two opposite sides of the fixed trestle;

the hinge further includes a support mechanism, the support mechanism includes a first support member and a second support member, the first support member is fixedly connected to the installation member of one of the linear sliding modules, and the second support member is fixedly connected to the installation member of the other one the linear sliding modules; and when the hinge in an unfolded state, the first support member and the second support member are configured to be relatively unfolded, the flexible display panel is configured to be unfolded and located on the first support member and the second support member; and when the hinge in a folded state, the first support member and the second support member are configured to be relatively folded, the flexible display panel is configured to be folded and located between the first support member and the second support member.

Beneficial Effects

Compared to the related arts, in the hinge and the foldable display device according to the present disclosure, the linear slider includes the first magnetic area with magnetism, the linear chute includes the second magnetic area with magnetism, and the first magnetic area and the second magnetic area have opposite pole directions. During the unfolding and folding processes of the hinge, the magnetic force generated between the first magnetic area and the second magnetic area changes along with a change of relative positions of the linear slider and the linear chute. Specifically, the magnetic force acting on the first magnetic area has the direction changing from the direction opposite to the sliding direction of the linear slider to the direction same with the sliding direction of the linear slider. When the magnetic force acting on the first magnetic area has the direction opposite to the sliding direction of the linear slider, the magnetic force is configured to provide the motion damping. When magnetic force acting on the first magnetic area has the direction same with the sliding direction of the linear slider, the magnetic force is configured to provide an unfolding force to the hinge for unfolding or provide a folding force to the hinge for folding. In particular, the magnetic force is configured to provide the unfolding force the folding force respectively at the unfolding moment and at the folding moment. Therefore, an arrangement of the first magnetic area and the second magnetic area can provide the motion damping, the unfolding force at the unfolding moment, and the folding force at the folding moment to the hinge, which is beneficial in reducing the friction forces generated by other dampers, thereby relieving wear degree of the other dampers in repeated unfolding and folding processes, and in turn enhancing stability and service life of the hinge.

DETAILED DESCRIPTION OF EMBODIMENTS

The technical solutions in the embodiments of the present disclosure will be clearly and completely described with reference to the accompanying drawings in the embodiments of the present disclosure. Obviously, the described embodiments merely indicate a part of the embodiments of the present disclosure, but not all the embodiments. Based on the embodiments in the present disclosure, all other embodiments obtained by those skilled in the art without creative work fall into the protection scope of the present disclosure.

A number of different embodiments or examples are provided below for implementing different structures of the present disclosure. In order to simplify the disclosure, parts and arrangements of specific examples are described below. Of course, they are only examples and are not intended to restrict the present disclosure. In addition, the present disclosure may repeat reference numbers and/or reference letters in different examples for the purpose of simplicity and clarity and by itself does not indicate the relationships between the various embodiments and/or arrangements discussed.

In addition to a curved sliding mechanism, a linear sliding mechanism is generally needed to provide connection in a hinge of a drop-shaped foldable display device. A sliding pair is formed by a linear chute and a linear slider of the hinge. When the hinge is operated to fold and unfold, the linear slider is configured to linearly slide in the linear chute.

Figure 1A:
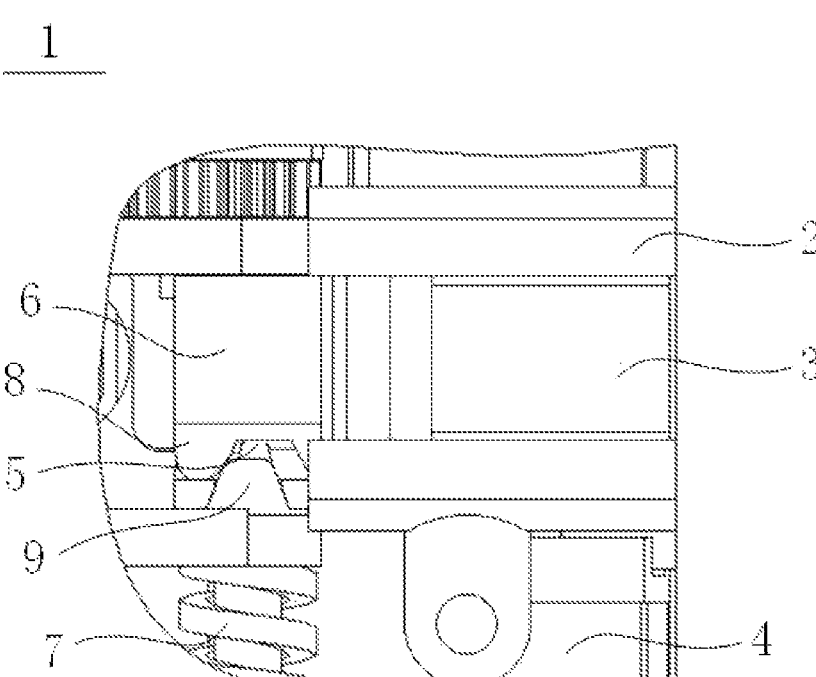
FIG. 1a is a schematic diagram showing a positional relationship between a linear slider and a linear chute when an exemplary hinge is in an unfolded state.
Figure 1B:
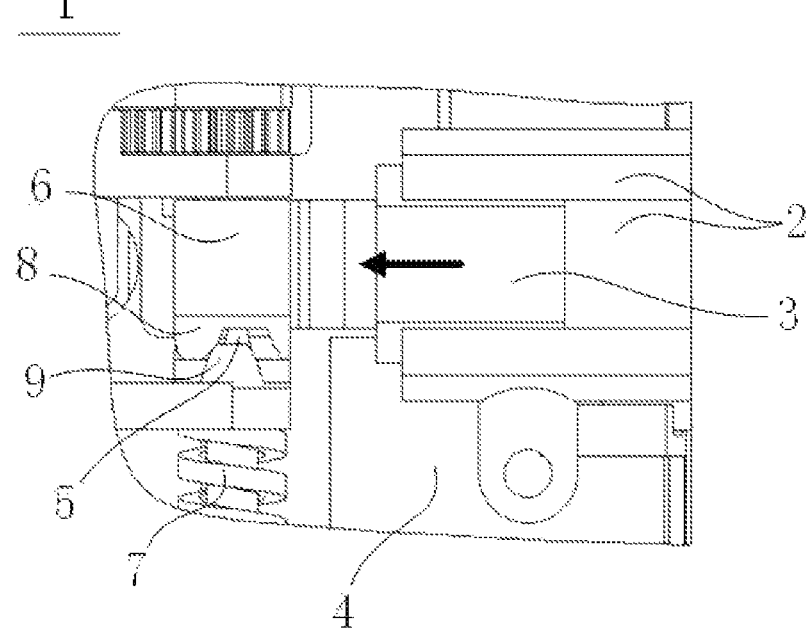
FIG. 1b is a schematic diagram showing a positional relationship between the linear slider and the linear chute when a state of the exemplary hinge is changing from the unfolded state to a folded state.
Figure 1C:
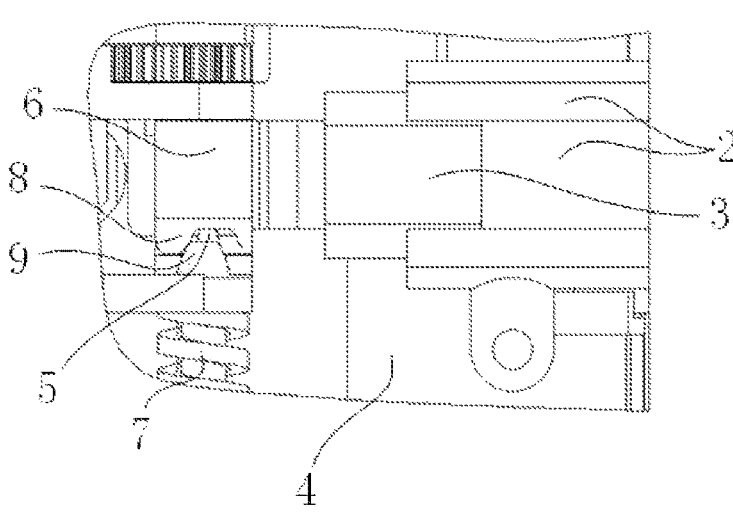
FIG. 1c is a schematic diagram showing a positional relationship between the linear slider and the linear chute when the exemplary hinge is in the folded state.

FIG. 1a to FIG. 1c are schematic diagrams showing positional relationships between the linear slider and the linear chute of a general hinge in different states.

As shown in FIG. 1a to FIG. 1c, in a direction perpendicular to a linear chute 2 and a linear slider 3, a side of the linear chute 2 away from the linear slider 3 is fixedly connected to a support plate 4 of the hinge 1, and the linear slider 3 is rotationally connected to a fixed trestle (not shown in the figures) of the hinge 1 through an extension part 6. An end of the extension part 6 is connected to the linear slider 3, and another end of the extension part 6 is rotationally connected to the fixed trestle. Specifically, an end of the extension part 6 away from the linear slider 3 is rotationally connected to the fixed trestle trough a shaft 5. An elastic member 7 adjacent to the extension part 6 is sleeved on the shaft 5. A first cam 8 is provided on a side of the extension part 6 adjacent to the elastic member 7, a second cam 9 is provided on a side of the elastic member 7 adjacent to the extension part 6, and the first cam 8 and the second cam 9 are abutted against with each other. Specifically, the first cam 8 is sleeved on the shaft 5 and includes a plurality of first protrudes (not shown in the figures) arranged at intervals, and a first groove (not shown in the figures) is defined between any two adjacent first protrudes. The second cam 9 is sleeved on the shaft 5 and includes a plurality of second protrudes (not shown in the figures) arranged at intervals, and a second groove (not shown in the figures) is defined between any two adjacent second protrudes.

As shown in FIG. 1a, when the hinge 1 is in an unfolded state, the linear slider 3 is configured to completely overlap with the linear chute 2, and the linear chute 2 is configured to be adjacent to the shaft 5. At the same time, the elastic member 7 is configured to be compressed, the first protrudes of the first cam 8 are configured to locate in the second grooves of the second cam 9, and the second protrudes of the second cam 9 are configured to locate in the first grooves of the first cam 8. The second cam 9 and the first cam 8 are configured to generate friction forces therebetween under an action of a compression force of the elastic member 7, so as to hold the hinge 1 in the unfolded state.

As shown in FIG. 1b, when the hinge 1 is in an intermediate state changing from the unfolded state to the folded state, the linear slider 3 is configured to linearly slide relative to the linear chute 2 along a direction towards the shaft 5. Correspondingly, the linear chute 2 is configured to linearly slide relative to the linear slider 3 along a direction away from the shaft 5. Thus, a distance between the linear chute 2 and the shaft 5 gradually increases. At the same time, the linear slider 3 is configured to rotate around the shaft 5 through the extension part 6, and the linear chute 2 is configured to rotate synchronously with the linear slider 3, so as to fold the hinge 1.

Specifically, during a folding process of the hinge 1, the elastic member 7 is configured to be always compressed, and the first cam 8 is configured to rotate around the shaft 5 along with the extension part 6. During a rotation process of the first cam 8, a contact surface between the first cam 8 and the second cam 9 is configured to change, and the first cam 8 is configured to squeeze the second cam 9 during the process, making the elastic member 7 further compressed. At the same time, the compression force of the elastic member 7 on the second cam 9 is configured to be translated into a twisting force having a direction opposite to a rotation direction of the first cam 8, so that the friction forces preventing rotation of the first cam 8 are generated between the first cam 8 and the second cam 9, thereby providing a motion damping to the hinge 1 for folding. It can be understood that the first cam 8, the second cam 9, and the elastic member 7 together form a main damper of the hinge 1, which is configured to provide the motion damping during the folding process (or an unfolding process) of the hinge 1.

As shown in FIG. 1c, when the hinge 1 is in a folded state, the linear slider 3 is configured to partially overlap with the linear chute 2, and the distance between the linear chute 2 and the shaft 5 is configured to be maximized. At the same time, the elastic member 7 is configured to be still compressed, the first protrudes of the first cam 8 are configured to locate in the second grooves of the second cam 9, and the second protrudes of the second cam 9 are configured to locate in the first grooves of the first cam 8. The second cam 9 and the first cam 8 are configured to generate the friction forces therebetween under the action of the compression force of the elastic member 7, so as to hold the hinge 1 in the folded state.

Since the foldable display device is operated to be unfolded or folded through the hinge 1, the first cam 8 and the second cam 9 of the main damper are prone to wear along with increase of an operation frequency of unfolding and folding the foldable display device, resulting in gradual decrease of stability of the hinge 1.

In order to relieve wear degree of the main damper (referring to the first cam and the second cam) and enhance service life of the hinge, the inventors found that a position of the linear chute and the linear slider of the hinge can be used as a damping compensation position. Specifically, a magnet group may be provided at the position of the linear chute and the linear slider, alternatively the linear chute and the linear slider may be directly made of magnetic material, so that a general linear sliding mechanism can be upgraded to a magnetic sliding mechanism. Thus, the motion damping and/or a retention force can be certainly provided to the hinge by a magnetic force, so the magnetic sliding mechanism can provide the motion damping and/or the retention force to the hinge together with the first cam, the second cam, and the elastic member, thereby preventing the first cam and the second cam from wearing due to too large friction forces therebetween, in turn being beneficial in enhancing stability and service life of the hinge. In view of above, a new hinge and a new foldable display device are provided according to the present disclosure, and specific structures thereof are described in following embodiments.

Figure 2:
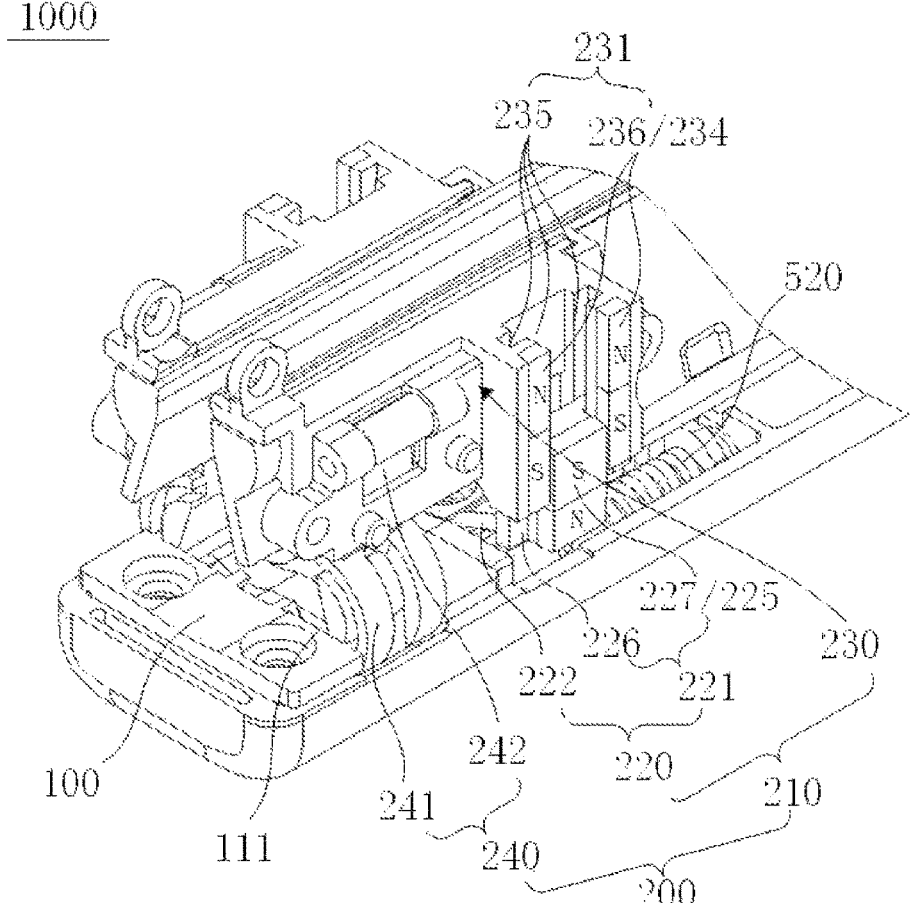
FIG. 2 is a schematic partial structural view of a hinge in a folded state according to an embodiment of the present disclosure.

As shown in FIG. 2, a hinge 1000 according to an embodiment of the present disclosure is provided. The hinge 1000 includes a fixed trestle 100 and a rotation mechanism 200. The rotation mechanism 200 include one or more linear sliding modules 210, and each of the linear sliding modules 210 includes a connection member 220 and an installation member 230.

Figure 4:
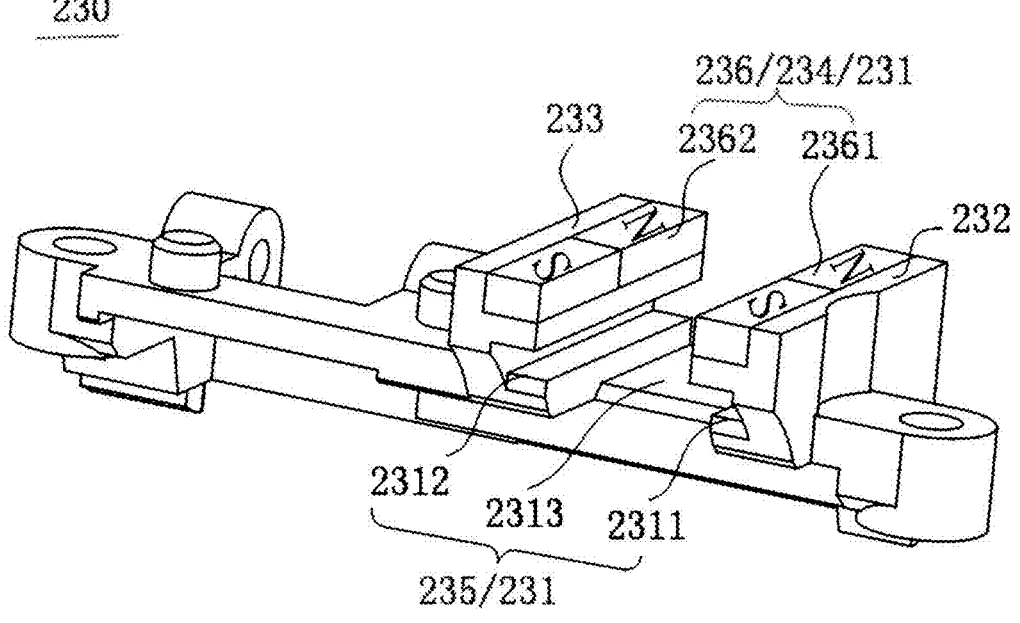
FIG. 4 is a schematic structural view of an installation member according to an embodiment of the present disclosure.
Figure 5:
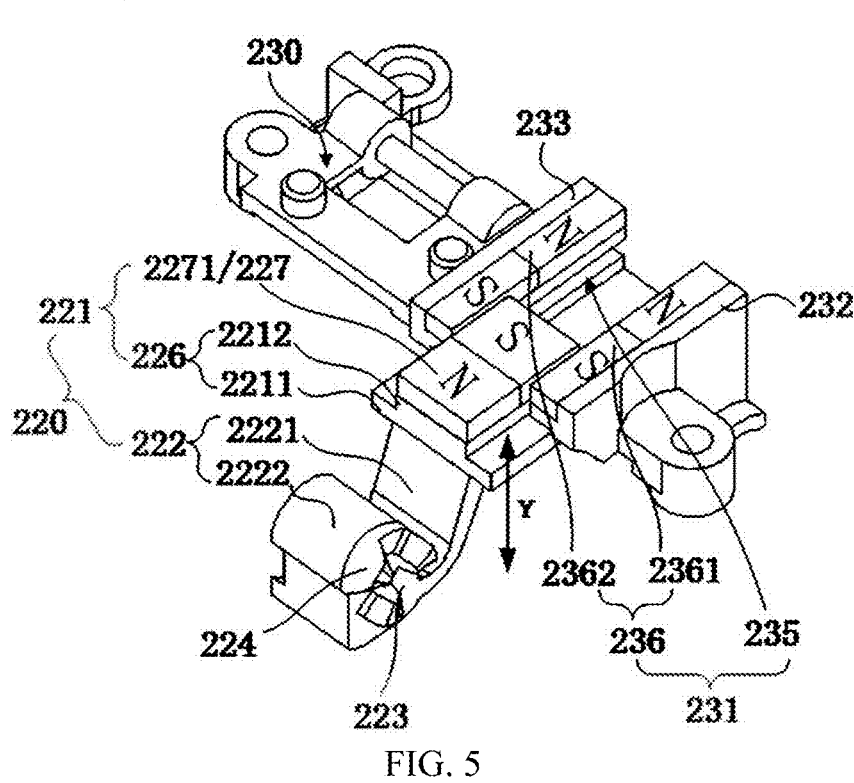
FIG. 5 is a schematic structural view of a linear sliding module according to an embodiment of the present disclosure.

As shown in FIG. 2, FIG. 4, and FIG. 5, the connection member 220 includes a linear slider 221 and an extension part 222 extending from the linear slider 221 along a direction towards the fixed trestle 100. The installation member 230 is provided with a linear chute 231. The linear slider 221 and the linear chute 231 are connected with each other in a linearly slidable mode, thereby forming a sliding pair. The extension part 222 and the fixed trestle 100 are rotationally connected with each other.

It should be noted that, a number of the linear sliding modules 210 of the hinge 1000 according to embodiments of the present disclosure is not limited. At the same time, a special distribution of multiple linear sliding modules 210 according to embodiments of the present disclosure is also not limited. For example, when the number of the linear sliding modules 210 is two, they may be symmetrically distributed on two opposite sides of the fixed trestle 100.

It can be understood that, the hinge 1000 is operated to fold and unfold through a rotation of the rotation mechanism 200 and a slide movement of the linear sliding module 210. For example, when the hinge 1000 is applied in a foldable display device, the rotation mechanism 200 at least includes two linear sliding modules 210 respectively and rotationally connected to two opposite sides of the fixed trestle 100, and the hinge 1000 is operated to fold and unfold through the rotation and the slide movement of the two linear sliding modules 210, thereby folding and unfolding the foldable display device.

Specifically, the linear slider 221 includes a first magnetic area 225 with magnetism, the linear chute 231 includes a second magnetic area 234 with magnetism, the second magnetic area 234 is adjacent to the first magnetic area 225, and the first magnetic area 225 and the second magnetic area 234 have opposite pole directions.

During an unfolding process and a folding process of the hinge 1000, the linear slider 221 is configured to linearly slide relative to the linear chute 231, the first magnetic area 225 and the second magnetic area 234 are configured to generate magnetic forces therebetween to interact on each other, the magnetic forces each have a direction configured to be parallel to a sliding direction of the linear slider 221, and a direction of the magnetic force acting on the first magnetic area 225 is configured to gradually change from a direction opposite to the sliding direction of the linear slider 221 to a direction same with the sliding direction of the linear slider 221.

It can be understood that, the first magnetic area 225 is at least a part of the linear slider 221, and the second magnetic area 234 is at least a part of the linear chute 231. When the linear slider 221 slides relative to the linear chute 231, relative positions of the first magnetic area 225 and the second magnetic area 234 are accordingly changed.

Figure 3A:
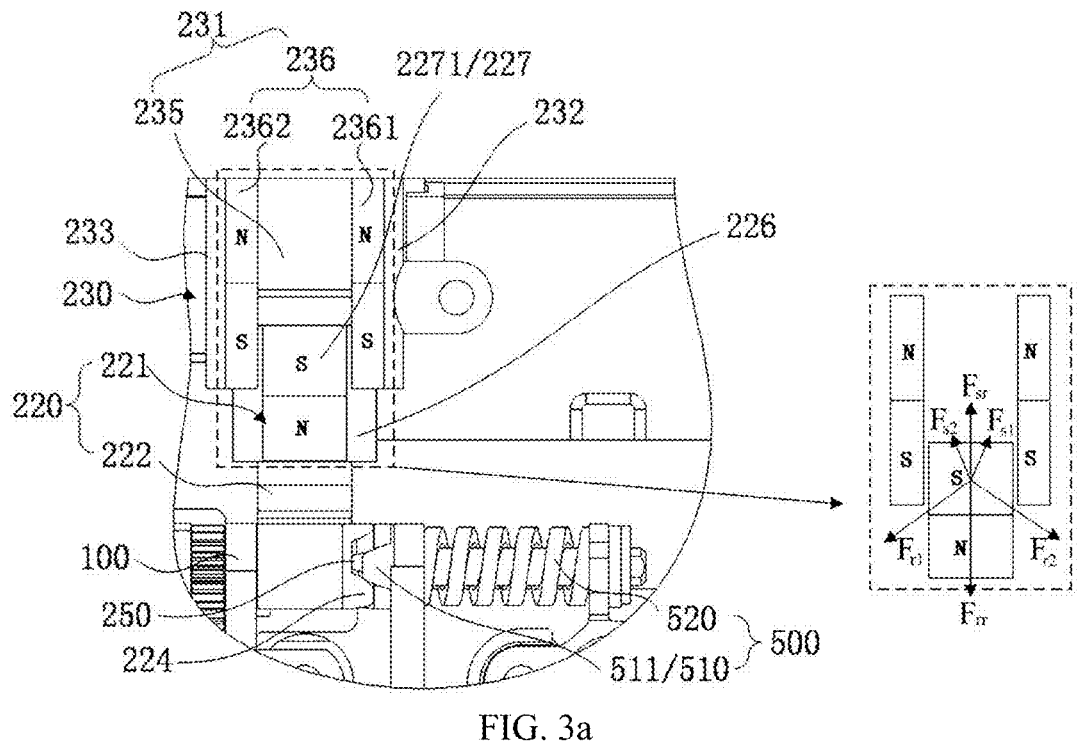
FIG. 3a is a combination of a schematic structural view of a linear sliding module and a schematic diagram of forces acting on a first magnetic member when a hinge is in a folded state according to an embodiment of the present disclosure.

It should be noted that, both repulsion forces and suction forces are generated between the first magnetic area 225 and the second magnetic area 234. Directions and magnitudes of the repulsion forces and the suction forces between the first magnetic area 225 and the second magnetic area 234 change along with change of the relative positions thereof. The magnetic force according to embodiments of the present disclosure refers to a resultant force of the repulsion force and the suction force in a direction parallel to the sliding direction of the linear slider 221 (referring to the first magnetic area 225). In other words, the direction of the magnetic force according to the present disclosure is parallel to the sliding direction of the linear slider 221. For example, in FIG. 3a, the force $F_{suction1}$ is referred briefly to as the force $F_{s1}$, the force $F_{suction2}$ is referred briefly to as the force $F_{s2}$, the force $F_{resultant1}$ is referred briefly to as the force $F_{r1}$, and the force $F_{resultant2}$ is referred briefly to as the force $F_{r2}$. Further, directions of $F_{repulsion\ resultant}$ (referring to a resultant force of the repulsion forces $F_{r1}$ and $F_{r2}$, and hereinafter "$F_{rr}$") and $F_{suction\ resultant}$ (referring to a resultant force of the suction forces $F_{s1}$ and $F_{s2}$, and hereinafter "$F_{sr}$") shown in FIG. 3a are parallel to the sliding direction of the linear slider 221.

It can be understood that, the magnetic force acting on the first magnetic area 225 and the magnetic force acting on the second magnetic area 234 are a pair of relative forces, that is, they have a same magnitude and opposite directions.

Specifically, the magnetic force acting on the first magnetic area 225 is equivalent to that acting on the linear slider 221, and the magnetic force acting on the second magnetic area 234 is equivalent to that acting on the linear chute 231. In other words, the magnetic module formed by the first magnetic area 225 and the second magnetic area 234 are configured to apply the magnetic forces to the linear slider 221 and the linear chute 231, respectively, thereby promoting or preventing the slide movement of the linear slider 221, and then promoting the hinge 1000 to unfold or fold, or preventing the hinge 1000 from unfolding or folding.

When the direction of the magnetic force acting on the first magnetic area 225 is opposite to the sliding direction of the linear slider 221, the slide movement of the linear slider 221 is prevented. In other words, the magnetic module formed by the first magnetic area 225 and the second magnetic area 234 provides a motion damping to the hinge 1000 for unfolding or folding. When the direction of the magnetic force acting on the first magnetic area 225 is same with the sliding direction of the linear slider 221, the slide movement of the linear slider 221 is promoted. In other words, the magnetic module formed by the first magnetic area 225 and the second magnetic area 234 provides an unfolding force to the hinge 1000 for unfolding and provides a folding force to the hinge 1000 for folding. Specifically, when the direction of the magnetic force acting on the first magnetic area 225 is same with the sliding direction of the linear slider 221, the unfolding force at an unfolding moment is provided to the hinge 1000, and the folding force at a folding moment s provided to the hinge 1000, so as to be beneficial in improving user experience.

It should be noted that, the unfolding force according to the embodiments of the present disclosure refers to a force that helps (or promotes) the hinge 1000 to unfold, and the folding force refers to a force that helps (or promotes) the hinge 1000 to fold.

Specifically, the linear slider 221 includes a sliding part 226 connected to the extension part 222 and a first magnetic member 227 fixed on the sliding part 226. The linear chute 231 includes a chute part 235 disposed on the installation member 230 and a second magnetic member 236 fixed on the chute part 235. The sliding part 226 and the chute part 235 are slidably connected with each other.

Specifically, the first magnetic member 227 is located in the first magnetic area 225, and the second magnetic member 236 is located in the second magnetic area 234. The first magnetic member 227 and the second magnetic member 236 are arranged adjacent to each other and have opposite pole directions.

Specifically, the first magnetic member 227 and the second magnetic member 236 are magnetic, and the sliding part 226 and the chute part 235 are non-magnetic.

It can be understood that, the sliding part 226 and the first magnetic member 227 together form the linear slider 221, and the sliding part 226 and the first magnetic member 227 are made of different materials. Similarly, the chute part 235 and the second magnetic member 236 together form the linear chute 231, and the chute part 235 and the second magnetic member 236 are made of different materials.

During a changing process of the hinge 1000 from the unfolded state to the folded state, the linear slider 221 is configured to linearly slide relative to the linear chute 231 along a direction towards the fixed trestle 100. It can be understood that, the first magnetic member 227 is configured to linearly slide relative to the second magnetic member 236 along the direction towards the fixed trestle 100. At the same time, the installation member 230 is overall configured to linearly slide relative to the connection member 220 along a direction away from the fixed trestle 100, and the second magnetic member 236 is configured to linearly slide relative to the first magnetic member 227 along the direction away from the fixed trestle 100.

As shown in FIG. 2 and FIG. 3a, when the hinge 1000 in the folded state, the sliding part 226 is configured to partially overlap with the chute part 235 through sliding, and the first magnetic member 227 and the second magnetic member 236 are configured to partially overlap. At the same time, the repulsion force $F_{rr}$ acting on the first magnetic member 227 by the second magnetic member 236 is greater than the suction force F Asr acting on the first magnetic member 227 by the second magnetic member 236, so the first magnetic member 227 is applied with the magnetic force F (referring to $F_{rr}$-$F_{sr}$) having the direction towards the fixed trestle 100. Since the direction of the magnetic force acting on the first magnetic member 227 is the same with the sliding direction of the linear slider 221 when the hinge 1000 is folded, the magnetic force is configured to hold positions of the linear slider 221 and the linear chute 231, thereby preventing relatively sliding between the linear slider 221 and the linear chute 231 which may cause the hinge 1000 to fail to fold. Therefore, when the hinge 1000 is in the folded state, the magnetic module formed by the first magnetic member 227 and the second magnetic member 236 can provide a retention force of folding to the hinge 1000.

It can be understood that, the directions of the repulsion force $F_{rr}$ and the suction force $F_{sr}$ according to embodiments of the present disclosure are parallel to the sliding direction of the linear slider 221.

It should be noted that, since the first magnetic member 227 is located in the first magnetic area 225, the magnetic force acting on the first magnetic member 227 is equivalent to that acting on the first magnetic area 225. Similarly, since the second magnetic member 236 is located in the second magnetic area 234, the magnetic force acting on the second magnetic member 236 is equivalent to that acting on the second magnetic area 234.

Figure 3B:
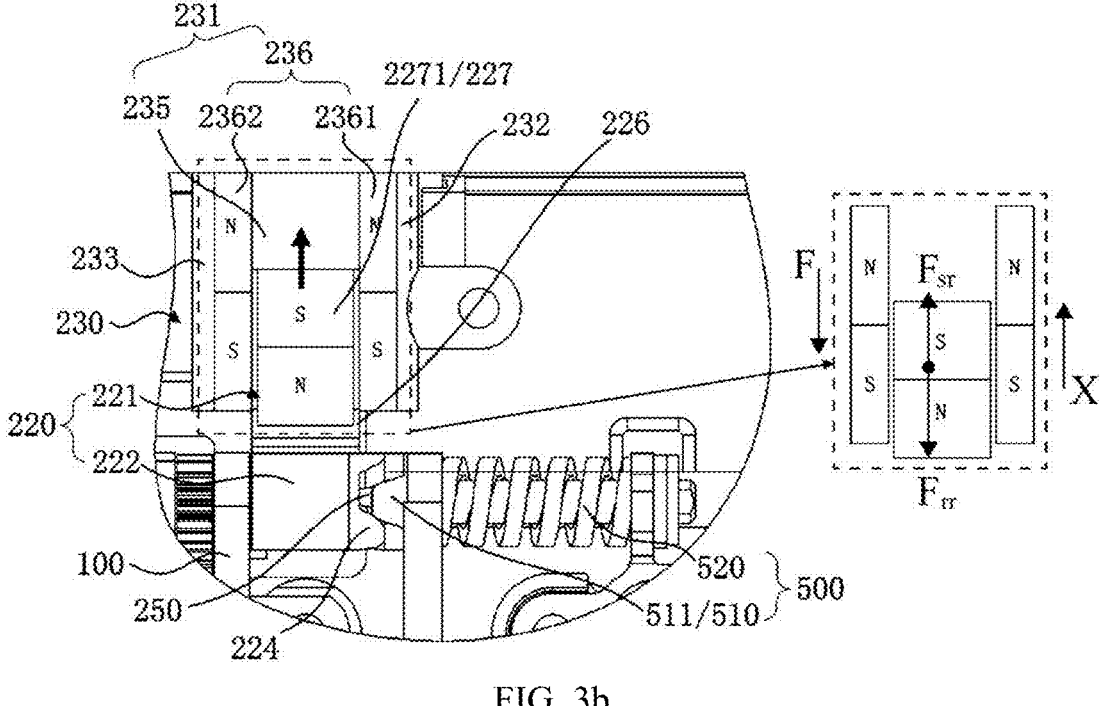
FIG. 3b is a schematic structural view of a linear sliding module when a state of a hinge is in a first unfolding phase according to an embodiment of the present disclosure.

As shown in FIG. 3b, during the changing process of the hinge 1000 from the folded state to the unfolded state, along with relatively sliding between the linear slider 221 and the linear chute 231, the overlap between the first magnetic member 227 and the second magnetic member 236 gradually increases. During the process, directions and magnitudes of the magnetic forces generated between the first magnetic member 227 and the second magnetic member 236 are configured to change, and the directions of the magnetic forces are configured to gradually change from directions of holding the folded state to directions of holding the unfolded state, for example, the directions of the magnetic forces are configured to gradually change from directions towards the fixed trestle 100 to directions away from the fixed trestle 100, thereby unfolding the hinge 1000.

Specifically, the changing process of the hinge 1000 from the folded state to the unfolded state can be divided into a first unfolding phase and a second unfolding phase in sequence. During the first unfolding phase, as shown in FIG. 3b, along with relatively sliding (see a right arrow X in FIGS. 3b and 3d) between the first magnetic member 227 and the second magnetic member 236, the overlap therebetween is configured to gradually increase, the repulsion force $F_{rr}$ acting on the first magnetic member 211 by the second magnetic member 236 has the direction towards the fixed trestle 100, and the repulsion force $F_{rr}$ is configured to gradually decrease. At the same time, the suction force $F_{sr}$ acting on the first magnetic member 211 by the second magnetic member 236 has the direction away from the fixed trestle 100, and the suction force $F_{sr}$ is configured to gradually increase. In this way, a direction (see a left arrow in FIG. 3b) of a resultant force (referring to the magnetic force F) of the repulsion force $F_{rr}$ and the suction force $F_{sr}$ is still towards the fixed trestle 100, but the resultant force F (where F=$F_{rr}$-$F_{sr}$) is configured to gradually decrease. During the second unfolding phase, as shown in FIG. 3d, along with further increase of the overlap between the first magnetic member 227 and the second magnetic member 236, the direction of the repulsion force $F_{rr}$ acting on the first magnetic member 211 by the second magnetic member 236 is configured to change to the direction away from the fixed trestle 100, and the repulsion force $F_{rr}$ is configured to gradually decrease. At the same time, the direction of the suction force $F_{sr}$ acting on the first magnetic member 211 by the second magnetic member 236 is still the direction away from the fixed trestle 100, and the suction force $F_{sr}$ is configured to gradually decrease. In this way, the direction (the left arrow in FIG. 3d) of the resultant force (referring to the magnetic force F) of the repulsion force $F_{rr}$ and the suction force $F_{sr}$ is away from the fixed trestle 100, and the resultant force F (where F=$F_{rr}$-$F_{sr}$) is configured to gradually decrease.

Therefore, during the first unfolding phase, the magnetic force with the direction towards the fixed trestle 100 is applied on the first magnetic member 227, that is the magnetic force acting on the first magnetic member 227 has the direction opposite to the sliding direction of the linear slider 221. During the second unfolding phase, the magnetic force with the direction away from the fixed trestle 100 is applied on the first magnetic member 227, that is the magnetic force acting on the first magnetic member 227 has the direction same with the sliding direction of the linear slider 221. It can be understood that, during the first unfolding phase, the magnetic module formed by the first magnetic member 227 and the second magnetic member 236 provides the motion damping of unfolding to the hinge 1000. During the second unfolding phase, the magnetic module formed by the first magnetic member 227 and the second magnetic member 236 provides the unfolding force to the hinge 1000 to promote unfolding. Obviously, during the second unfolding phase, the magnetic module formed by the first magnetic member 227 and the second magnetic member 236 is configured to provide the unfolding force at the unfolding moment of the hinge 1000, which is beneficial in automatically unfolding of the hinge 1000.

It should be noted that, the direction towards the fixed trestle 100 and the direction away from the fixed trestle 100 according to embodiments of the present disclosure each have the linear slider 221 as a starting point. For example, the direction towards the fixed trestle 100 refers to a direction from the linear slider 221 towards the fixed trestle 100. Correspondingly, the direction away from the fixed trestle 100 refers to a direction from the linear slider 221 away from the fixed trestle 100.

Similarly, during a changing process of the hinge 1000 from the unfolded state to the folded state, directions and magnitudes of the magnetic forces generated between the first magnetic member 227 and the second magnetic member 236 are also configured to change. Specifically, the directions of the magnetic forces are configured to change from the directions of holding the unfolded state to the directions of holding the folded state, for example, the directions of the magnetic forces are configured to change from the directions away from the fixed trestle 100 to the directions towards the fixed trestle 100, thereby folding the hinge 1000.

Specifically, the changing process of the hinge 1000 from the unfolded state to the folded state can be divided into a first folding phase and a second folding phase in sequence. During the first folding phase, as shown in FIG. 3e, along with relatively sliding (see a right arrow X in FIGS. 3e and 3f) between the first magnetic member 227 and the second magnetic member 236, the overlap therebetween is configured to gradually decrease, the repulsion force $F_{rr}$ acting on the first magnetic member 211 by the second magnetic member 236 has the direction away from the fixed trestle 100, and the repulsion force $F_{rr}$ is configured to gradually increase. At the same time, the suction force $F_{sr}$ acting on the first magnetic member 211 by the second magnetic member 236 has the direction away from the fixed trestle 100, and the suction force $F_{sr}$ is configured to gradually increase. In this way, the direction (see a left arrow in FIG. 3e) of the resultant force (referring to the magnetic force F) of the repulsion force $F_{rr}$ and the suction force $F_{sr}$ is away from the fixed trestle 100, and the resultant force F (where $F=F_{rr}+F_{sr}$) is configured to gradually increase. During the second folding phase, as shown in FIG. 3f, along with further decrease of the overlap between the first magnetic member 227 and the second magnetic member 236, the direction of the repulsion force $F_{rr}$ acting on the first magnetic member 211 by the second magnetic member 236 is configured to change to the direction towards the fixed trestle 100, and the repulsion force $F_{rr}$ is configured to gradually increase. At the same time, the direction of the suction force $F_{sr}$ acting on the first magnetic member 211 by the second magnetic member 236 is still the direction away from the fixed trestle 100, and the suction force $F_{sr}$ is configured to gradually decrease. In this way, the direction (see a left arrow in FIG. 3f) of the resultant force (referring to the magnetic force F) of the repulsion force $F_{rr}$ and the suction force $F_{sr}$ is towards the fixed trestle 100, and the resultant force F (where $F=F_{rr}-F_{sr}$) is configured to gradually increase.

In other words, during the first folding phase, the magnetic force with the direction away from the fixed trestle 100 is applied on the first magnetic member 227, that is, the magnetic force acting on the first magnetic member 227 has the direction opposite to the sliding direction of the linear slider 221. During the second folding phase, the magnetic force with the direction towards the fixed trestle 100 is applied on the first magnetic member 227, that is, the magnetic force acting on the first magnetic member 227 has the direction same with the sliding direction of the linear slider 221. It can be understood that, during the first folding phase, the magnetic module formed by the first magnetic member 227 and the second magnetic member 236 provides the motion damping of folding to the hinge 1000. During the second folding phase, the magnetic module formed by the first magnetic member 227 and the second magnetic member 236 provides the unfolding force to the hinge 1000 for promoting folding. Obviously, during the second folding phase, the magnetic module formed by the first magnetic member 227 and the second magnetic member 236 is configured to provide the folding force at the folding moment to the hinge 1000, which is beneficial in automatically folding of the hinge 1000.

Figure 3C:
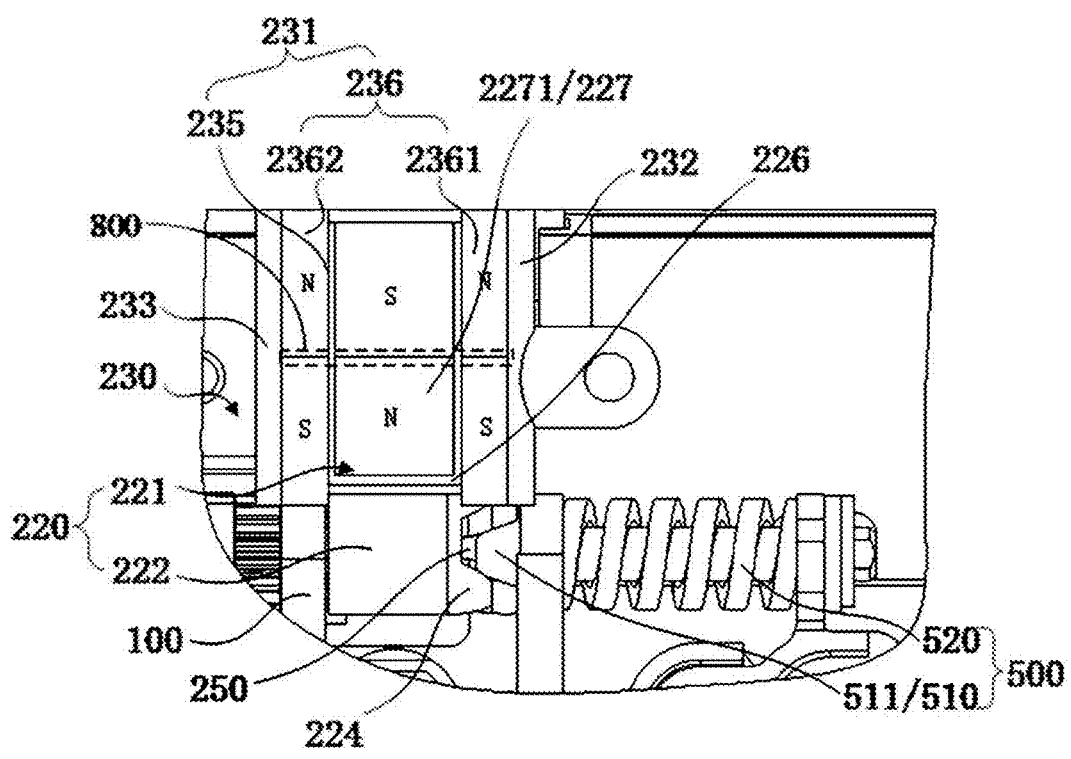
FIG. 3c is a schematic structural view of a linear sliding module when a hinge is in an unfolded state according to an embodiment of the present disclosure.
Figure 3D:
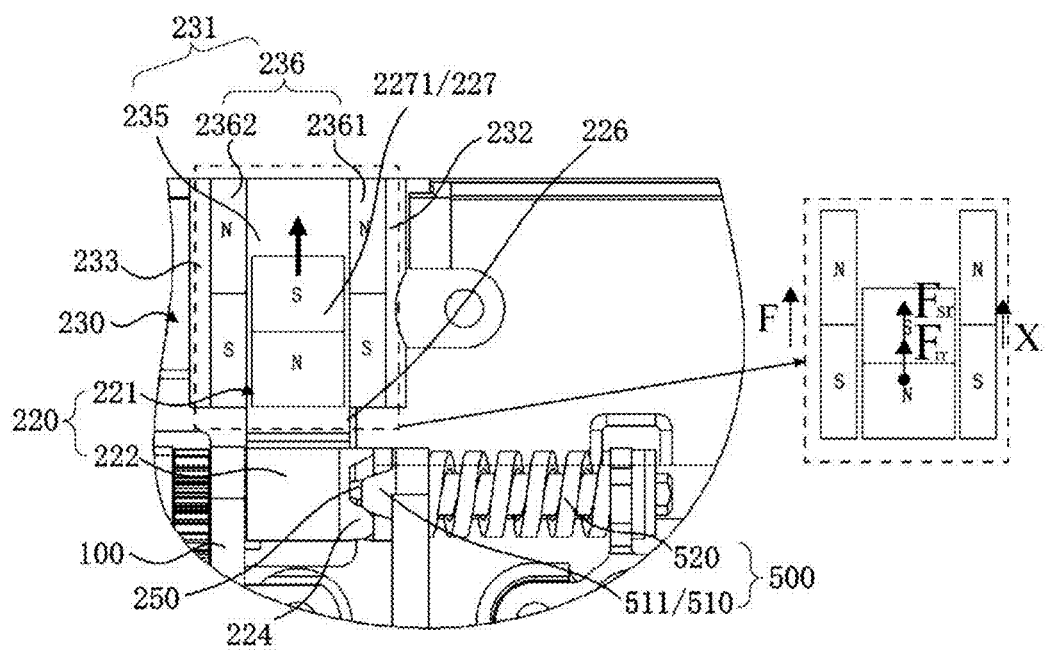
FIG. 3d is a schematic structural view of a linear sliding module when a state of a hinge is in a second unfolding phase according to an embodiment of the present disclosure.
Figure 3E:
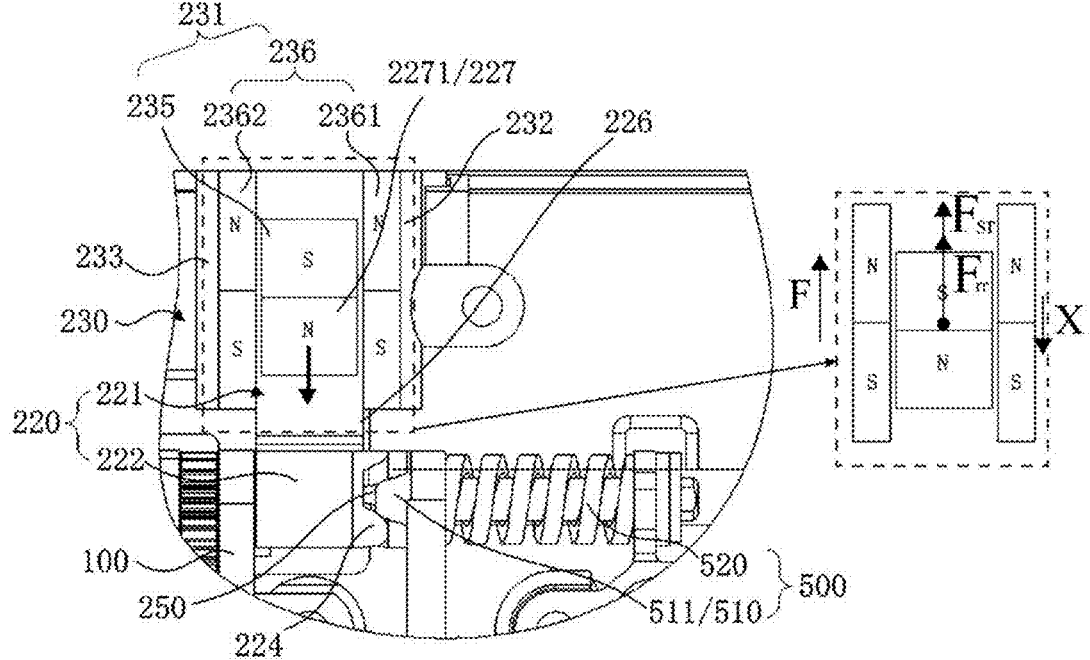
FIG. 3e is a schematic structural view of a linear sliding module when a state of a hinge is in a first folding phase according to an embodiment of the present disclosure.
Figure 3F:
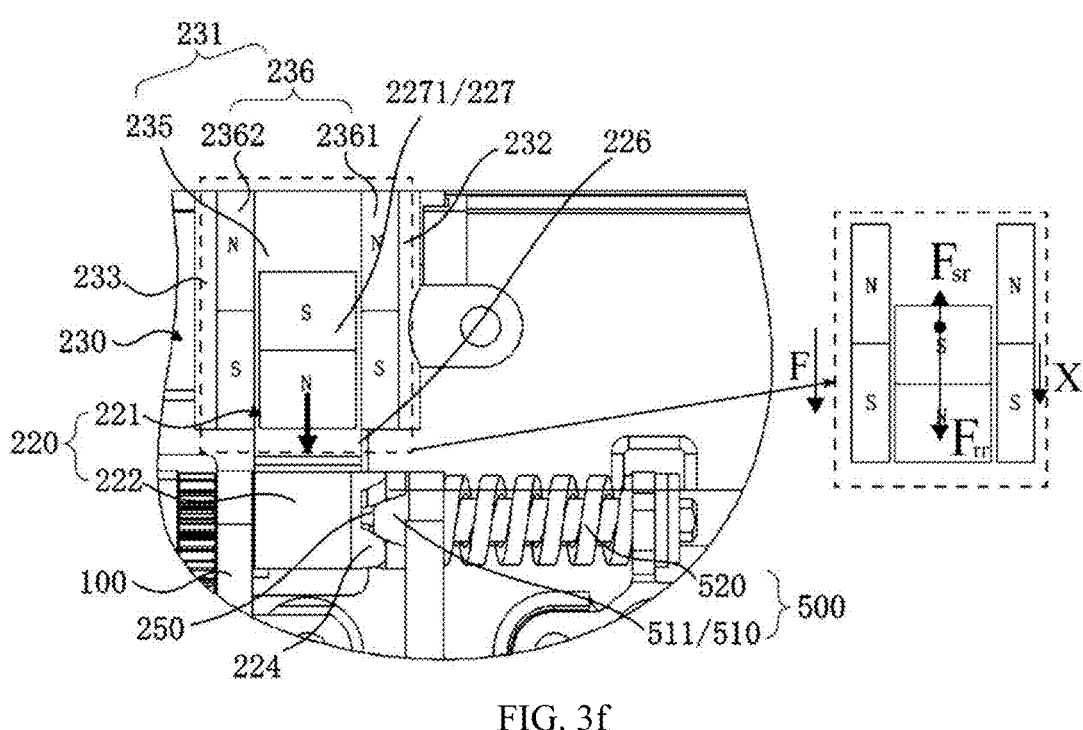
FIG. 3f is a schematic structural view of a linear sliding module when a state of a hinge is in a second folding phase according to an embodiment of the present disclosure.

As shown in FIG. 3c, when the hinge 1000 is in the unfolded state, the sliding part 226 and the chute part 235 are configured to completely overlap with each other. In this way, the first magnetic member 227 and the second magnetic member 236 are configured to be side-by-side, and the magnetic force acting on the first magnetic member 227 in the sliding direction of the linear slider 221 is zero. It should be noted that, when the hinge 1000 in the unfolded state, the repulsion forces and the suction forces generated between the first magnetic member 227 and the second magnetic member 236 are balanced, so that the magnetic force in the sliding direction of the linear slider 221 is zero, and this state at the moment may also be defined as a reset state of the linear sliding module 210. At the same time, since the retention force of holding the balance between the first magnetic member 227 and the second magnetic member 236 is applied on the sliding part 226 and the chute part 235, positions of the sliding part 226 and the chute part 235 are fixed, thereby holding the hinge 1000 in the unfolded state.

Specifically, as shown in FIGS. 3a to 3c, a distance between the first magnetic member 227 and the second magnetic member 236 is greater than zero. In other words, the first magnetic member 227 and the second magnetic member 236 do not have mechanical contact during a relatively moving process, that is, the magnetic force generated therebetween is a non-contact force. Therefore, while the retention force of folding or unfolding is provided to the hinge 1000 by the first magnetic member 227 and the second magnetic member 236, the mechanical contact therebetween is avoided according to the embodiments of the present disclosure. Thus, the first magnetic member 227 and the second magnetic member 236 are prevented from further wearing due to friction forces therebetween, and stability of the hinge 1000 in long-term use is then enhanced.

Specifically, as shown in FIG. 2 and FIG. 5, the extension part 222 includes a connection part 2221 and a rotation part 2222. Herein, an end of the connection part 2221 is connected to the sliding part 226, and another end of the connection part 2221 is connected to the rotation part 2222, and the rotation part 2222 is rotationally connected to the fixed trestle 100.

As shown in FIG. 3a to FIG. 3c, the rotation part of the extension part 222 is rotationally connected to the fixed trestle 100 through a shaft 250. As shown in FIG. 5, the rotation part 2222 of the extension part 222 is provided with a hole 223 for the shaft 250 to pass through.

It should be noted that, the shaft 250 according to the embodiments may be a virtual axis or an entity shaft, and the entity shaft is taken as an example for illustration according to the embodiments of the present disclosure.

Specifically, the shaft 250 is fixedly connected to the fixed trestle 100, and the rotation part 2222 is rotationally connected to the shaft 250; alternatively, the shaft 250 is rotationally connected to the fixed trestle 100, and the rotation part 2222 is connected to the shaft 250. In other words, the rotation part 2222 may be fixedly or flexibly connected to the shaft 250, which is not limit in the embodiments.

As shown in FIG. 5, in a direction Y (i.e., a thickness direction of each of the linear slider and the linear chute) perpendicular to the linear slider 221 and the linear chute 231, the first magnetic member 227 is fixed on a side of the sliding part 226 away from the chute part 235, and the second magnetic member 236 is arranged along an extending direction of the chute part 235 and is adjacent to the first magnetic member 227.

Specifically, as shown in FIG. 2 and FIG. 5, the first magnetic member 227 includes a first bar magnet 2271, the second magnetic member 236 includes a second bar magnet 2361 and a third bar magnet 2362 symmetrically disposed on both sides of the chute part 235 and having a same pole direction. The first bar magnet 2271, the second bar magnet 2361, and the third bar magnet 2362 each have an extending direction same with the extending direction of the chute part 235. It can be understood that, a pole direction of the first bar magnet 2271 and a pole direction of the second bar magnet 2361 are opposite.

It can be understood that, the first bar magnet 2271, the second bar magnet 2361, and the third bar magnet 2362 are each divided into two parts of a first magnetic pole and the second magnetic pole. For example, the first magnetic pole may refer to a North pole (N-pole for short), and the second magnetic pole may refer to a South pole (S-pole for short), but not limited, and the N-pole and the S-pole can also be switched in reverse. The pole direction according to the embodiments refers to a direction from the first magnetic pole towards the second magnetic pole, alternatively, refers to a direction from the second magnetic pole towards the first magnetic pole. According the principle of homopolar repulsion and heteropolar attraction of magnets, when the first bar magnet 2271 has a movement relative to the second bar magnet 2361 and third bar magnet 2362, magnitudes and directions of repulsion forces and suction forces acting on the first bar magnet 2271 by the second bar magnet 2361 and the third bar magnet 2362 are configured to change, which cause the magnitude and the direction of the magnetic force to change.

As shown in FIG. 3a, when the hinge 1000 is in the folded state, a distance between an end of the first bar magnet 2271 away from the extension part 222 and a magnetic pole interface of the second bar magnet 2361 and a distance between the end of the first bar magnet 2271 away from the extension part 222 and a magnetic pole interface of the third bar magnet 2362 are greater than zero. Since the pole directions of the first bar magnet 2271 and the second bar magnet 2361 (as well as the third bar magnet 2362) are opposite, when the hinge 1000 is in the folded state, the repulsion force $F_{rr}$ acting on the first bar magnet 2271 by the second bar magnet 2361 and the third bar magnet 2362 is obviously greater than the suction force $F_{sr}$. Thus, the direction of the magnetic force of acting on the first magnetic member 227 is same with the sliding direction of the linear slider 221 when the hinge 1000 folded.

It should be noted that, the magnetic pole interface refers to a contact interface between a part of the bar magnet including the first magnetic pole and another part of the bar magnet including the second magnetic pole.

As shown in FIG. 3c, when the hinge 1000 is in the unfolded state, the magnetic pole interface of the first bar magnet 2271, the magnetic pole interface of the second bar magnet 2361, and the magnetic pole interface of the third bar magnet 2362 are configured to be in a same plane which is perpendicular to the extending direction of the chute part 235. That is, the magnetic pole interfaces 800 of the first bar magnet 2271, the second bar magnet 2361 and the third bar magnet 2362 are linearly arranged in a direction perpendicular to the extending direction of the chute part. At the same time, the first bar magnet 2271, the second bar magnet 2361, and the third bar magnet 2362 are configured to be side-by-side, and the repulsion forces and the suction forces among there are balanced. At the same time, a part of the first bar magnet 2271 including the first magnetic pole, a part of the second bar magnet 2361 including the second magnetic pole, and a part of the third bar magnet 2362 including the second magnetic pole are configured to be side-by-side, and another part of the first bar magnet 2271 including the second magnetic pole, another part of the second bar magnet 2361 including the first magnetic pole, and another part of the third bar magnet 2362 including the first magnetic pole are configured to be side-by-side. It can be understood that, the part of the first bar magnet 2271 including the first magnetic pole, the part of the second bar magnet 2361 including the second magnetic pole, and the part of the third bar magnet 2362 including the second magnetic pole are configured to be mutually attracted, and the another part of the first bar magnet 2271 including the second magnetic pole, the another part of the second bar magnet 2361 including the first magnetic pole, and the another part of the third bar magnet 2362 including the first magnetic pole are configured to be mutually attracted, thereby holding the balance between the first magnetic member 227 and the second magnetic member 236.

In a specific embodiment, a length of the first bar magnet 2271 is less than or equal to a length of the chute part 235, a length of the second bar magnet 2361 and a length of the third bar magnet 2362 are equal to the length of the chute part 235. This design can ensure that the linear sliding module 210 can be subjected by the magnetic force during the whole sliding process.

Of course, the length of the first bar magnet 2271, the length of the second bar magnet 2361, and the length of the third bar magnet 2362 can be adjusted according to actual situations.

Specifically, as shown in FIG. 4, the chute part 235 includes a first limiting chute 2311, a second limiting chute 2312, and a guiding chute 2313. Openings of the first limiting chute 2311 and the second limiting chute 2312 are configured to face each other. The guiding chute 2313 is located between the first limiting chute 2311 and the second limiting chute 2312 and is communicated with the first limiting chute 2311 and the second limiting chute 2312. As shown in FIG. 4 and FIG. 5, the sliding part 226 includes a sliding body 2211 located in the first limiting chute 2311, the second limiting chute 2312, and the guiding chute 2313. The first bar magnet 2271 is located on a side of the sliding body 2211 away from the guiding chute 2313 and corresponds to the guiding chute 2313. The second bar magnet 2361 is located on an outer surface of a lateral wall of the first limiting chute 2311, and the third bar magnet 2362 is located on an outer surface of a lateral wall of the second limiting chute 2312.

Specifically, as shown in FIG. 4 and FIG. 5, the guiding chute 2313 may also be configured to extend away from the sliding part 226, so that there is a gap between the sliding part 226 and a bottom of the guiding chute 2313. On one hand, it is beneficial in reducing a wall thickness of a position of the installation member 230 corresponding to the guiding chute 2313, so as to prevent uneven wall thickness after sintering from leading to shrinkage. On the other hand, the gap may be filled with an appropriate amount of grease to improve wear resistance of the linear sliding module 210.

Specifically, as shown in FIG. 4 and FIG. 5, in the direction perpendicular to the linear slider 221 and the linear chute 231, the sliding part 226 further includes a protrude part 2212 located on a side of the sliding body 2211 away from the guiding chute 2313 and corresponds to the guiding chute 2313. The first bar magnet 2271 is located on a side of the protrude part 2212 away from the sliding body 2211.

In a specific embodiment, a thickness of the protrude part 2212 is equal to a thickness of the lateral wall of the first limiting chute 2311 adjacent to the protrude part 2212, and is equal to a thickness of the lateral wall of the second limiting chute 2312 adjacent to the protrude part 2212, so that a side of the protrude part 2212 away from the guiding chute 2313 is flush with the lateral wall of the first limiting chute 2311 adjacent to the protrude part 2212 and the lateral wall of the second limiting chute 2312, and the first bar magnet 2271, the second bar magnet 2361 and the third bar magnet 2362 are at a same level, thereby being beneficial in improving magnetic effect on basis of saving a volume of the magnets.

In a specific embodiment, as shown in FIG. 4 and FIG. 5, the installation member 230 further includes a first limiting plate 232 located on an outer surface of a bottom wall of the first limiting chute 2311 and protruding along a direction perpendicular to the installation member 230, and a second limiting plate 233 located on an outer surface of a bottom wall of the second limiting chute and protruding along the direction perpendicular to the installation member 230. An extending direction of the first limiting plate 232 and an extending direction of the second limiting plate 233 are same with an extending direction of the guiding chute 2313. A side of the second bar magnet 2361 away from the third bar magnet 2362 is in contact with the first limiting plate 232, and a side of the third bar magnet 2362 away from the second bar magnet 2361 is in contact with the second limiting plate 233. The first limiting plate 232 and the second limiting plate 233 are configured to fix positions of the second bar magnet 2361 and the third bar magnet 2362.

Specifically, as shown in FIG. 2, the rotation mechanism 200 further includes another connection member 240, and the connection member 240 includes an arc slider 241 and another extension part 242 extending a direction from the arc slider 241 towards the installation member 230. Correspondingly, the fixed trestle 100 includes an arc chute 111 corresponding to the arc slider 241. The arc slider 241 is located in the arc chute 111 and is rotationally connected to arc chute 111. The extension part 242 is flexibly connected to the installation member 230. During the folding process or the unfolding process of the hinge 1000, the arc slider 241 is configured to rotate and slide in the arc chute 111, thereby providing guidance for movement of the installation member 230.

Specifically, as shown in FIG. 2 and FIG. 3a to FIG. 3c, the hinge 1 further includes a position mechanism 500, and the position mechanism 500 includes a position member 510 and an elastic member 520. Herein, the position member 510 and the elastic member 520 are sleeved on the shaft 250. An end of the elastic member 520 is connected to the position member 510, and another end of the elastic member 520 is connected to the fixed trestle 1000. The elastic member 520 is disposed adjacent to a rotation part of the extension part 222, and the position member 510 is located between the elastic member 520 and the rotation part of the extension part 222. An end of the rotation part of the extension part 222 adjacent to the elastic member 520 is provided with a first cam 224, and the position member 510 includes a second cam 511 abutting against the first cam 224. The first cam 224 and the second cam 511 are sleeved on the shaft 250.

Specifically, the first cam 224 includes a plurality of first protrudes (not shown in the figures) arranged at intervals and facing the second cam 511, and there is a first groove (not shown in the figures) defined between any two adjacent first protrudes. The second cam 511 includes a plurality of second protrudes (not shown in the figures) arranged at intervals and facing the first cam 224, and there is a second groove (not shown in the figures) defined between any two adjacent second protrudes.

During the changing process of the hinge 1000 from the unfolded state to the folded state, or the changing process of the hinge 1000 from the folded state to the unfolded state, the elastic member is always in a state of elastic deformation, in particular, in a state of compression. The first cam 224 is configured to rotate around the shaft 250. During a rotation process of the first cam 224, a contact surface between the first cam 224 and the second cam 511 is configured to change, and the first cam 224 is configured to squeeze the second cam 511, thereby further compressing the elastic member 520. At the same time, a compression force of the elastic member 520 on the second cam 511 is configured to be translated into a twisting force having a direction opposite to a rotation direction of the first cam 224, so that a friction force preventing rotation of the first cam 224 is generated between the first cam 224 and the second cam 511. It can be understood that, the first cam 224, the second cam 511, and the elastic member 520 together form a main damper of the hinge 1000, which is configured to provide the motion damping during the folding process or the unfolding process of the hinge 1000.

At the same time, when the hinge 1000 is during the first folding phase and the first unfolding phase, the magnetic force having a direction opposite to the sliding direction of the linear slider 221 is generated between the first magnetic member 227 and the second magnetic member 236, which is configured to provide the motion damping to the hinge 1000. In other words, the magnetic module formed by the first magnetic member 227 and the second magnetic member 236 can provide the motion damping together with the main damper of the hinge 1000, that is, the magnetic module formed by the first magnetic member 227 and the second magnetic member 236 is configured to share responsibility of the main damper of the hinge 1000. Thus, it is beneficial in reducing required friction forces of the main damper of hinge 1000, so as to relieve wear degree of the main damper in repeated folding and unfolding processes, and then enhance the stability and the service life of the hinge 1000.

When the hinge 1000 is in the unfolded state or the folded state, the first protrudes of the first cam 224 are configured to be accommodated in the second grooves, and the second protrudes of the second cam 511 are configured to be accommodated in the first grooves. The elastic member 520 is always in the state of compression. Friction forces are generated between the second cam 511 and the first cam 224 under an action of the compression force of the elastic member 520 to hold the hinge 1000 in the unfolded state or in the folded state.

At the same time, when the hinge 1000 is in the folded state, the magnetic forces holding the hinge 1000 in the folded state are generated between the first magnetic member 227 and the second magnetic member 236. And when the hinge 1000 in the unfolded state, the repulsion forces and the suction forces generated between the first magnetic member 227 and the second magnetic member 236 are balanced to hold the hinge 1000 in the unfolded state. In other words, the magnetic module formed by the first magnetic member 227 and the second magnetic member 236 can provide the retention force of folding or unfolding together with the main damper of the hinge 1000.

It should be noted that, the elastic member 520 may be a spring, but not limited.

Specifically, the hinge 1000 further includes a support mechanism, a synchro-mechanism, and other structures. For a detailed description of the support mechanism and the synchro-mechanism, see the description according to the embodiments of the foldable display device.

According to the embodiments of the present disclosure, the linear slider 221 and the linear chute 231 are advanced in structures and materials, so the linear slider 221 includes the first magnetic area 225 with magnetism, the linear chute 231 includes the second magnetic area 234 with magnetism, and the first magnetic area 225 and the second magnetic area 234 have opposite pole directions. During the unfolding process and the folding process of the hinge 1000, the magnetic forces generated between the first magnetic area 225 and the second magnetic area 234 change along with relative movement between the linear slider 221 and the linear chute 231. Specifically, the direction of the magnetic force acting on the first magnetic area 225 gradually changes from the direction opposite to the sliding direction of the linear slider 221 to the direction same with the sliding direction of the linear slider 221. When the direction of the magnetic force acting on the first magnetic area 225 is opposite to the sliding direction of the linear slider 221, the magnetic force is configured to provide the motion damping to the hinge 1000. When the direction of the magnetic force acting on the first magnetic area 225 is same with the sliding direction of the linear slider 221, the magnetic force is configured to provide the unfolding force which unfolds the hinge 1000 or provide the folding force which folds the hinge 1000. In particular, the magnetic force can provide the unfolding force and the folding force respectively at the unfolding moment and the folding moment of the hinge 1000. Thus, the arrangement of the first magnetic area 225 and the second magnetic area 234 can at least provide the motion damping, the unfolding force at the unfolding moment, and the folding force at the folding moment to the hinge 1000, which is beneficial in reducing the friction forces generated by other dampers (such as the first cam 224 and the second cam 511) of hinge 1000, thereby relieving wear degree of the other dampers in repeated unfolding and folding processes, and then enhancing the stability and the service life of the hinge 1000.

In addition, the magnetic forces provide by the first magnetic area 225 and the second magnetic area 234 are non-contact forces, so as to avoid a direct mechanical contact between the first magnetic area 225 and the second magnetic area 234, thereby preventing from further wearing due to friction forces therebetween, and then enhancing stability of the hinge 1000 in long-term use.

Figure 6:
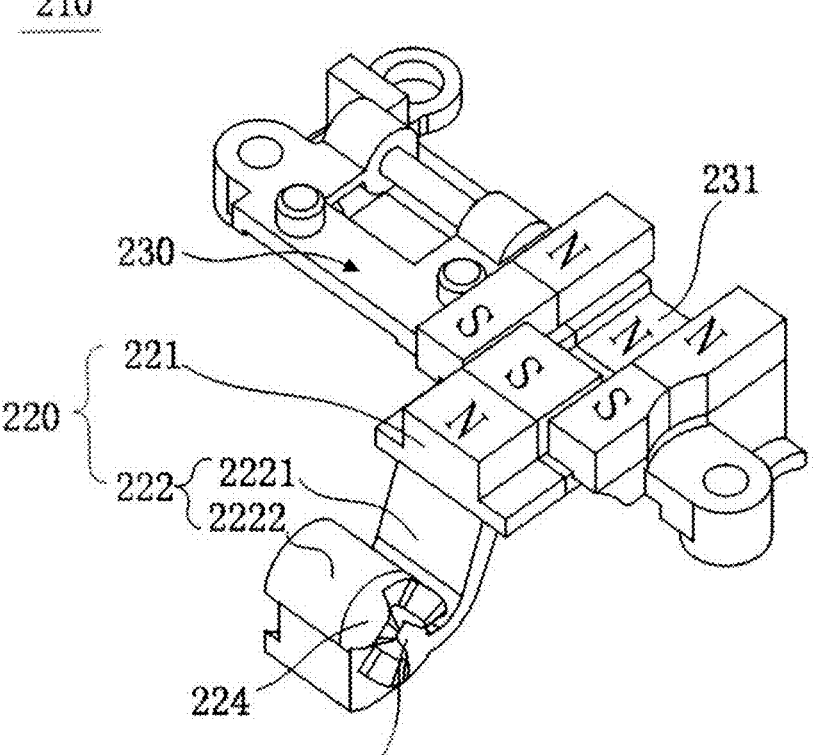
FIG. 6 is a schematic structural view of another linear sliding module according to an embodiment of the present disclosure.

Another hinge is provided, which differs from the above embodiment in that, as shown in FIG. 6, a material of the linear slider 221 includes a magnetic material, and a material of the linear chute 231 includes a magnetic material. In other words, the entire linear slider 221 independently forms the first magnetic member located in the first magnetic area, the entire linear chute 231 independently forms the second magnetic member in the second magnetic area, and the first magnetic member and the second magnetic member have opposite pole directions. It can be understood that, the linear slider 221 and the linear chute 231 are equivalent to two independent magnets according to the embodiment.

The embodiment has advantages described in the preceding embodiment and will not be repeated here.

Figure 7:
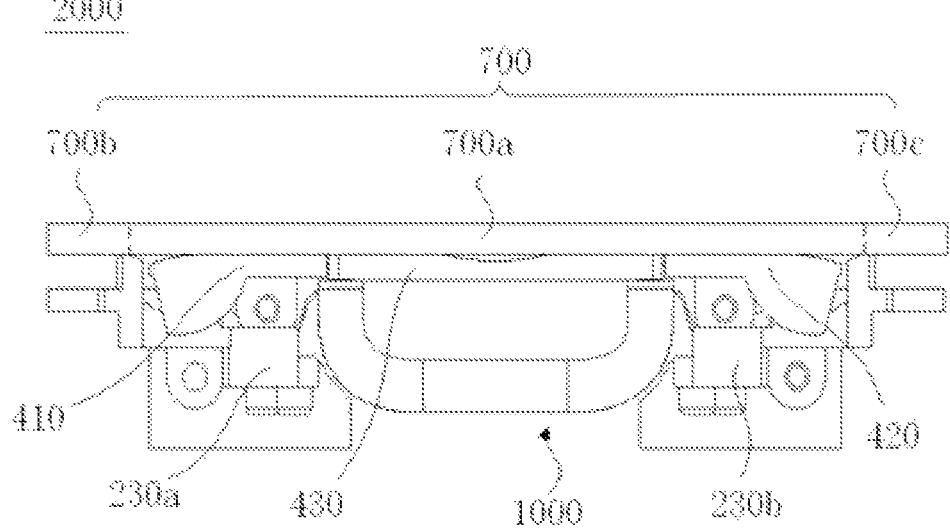
FIG. 7 is a schematic partial structural view of a foldable display device in an unfolded state according to an embodiment of the present disclosure.
Figure 8:
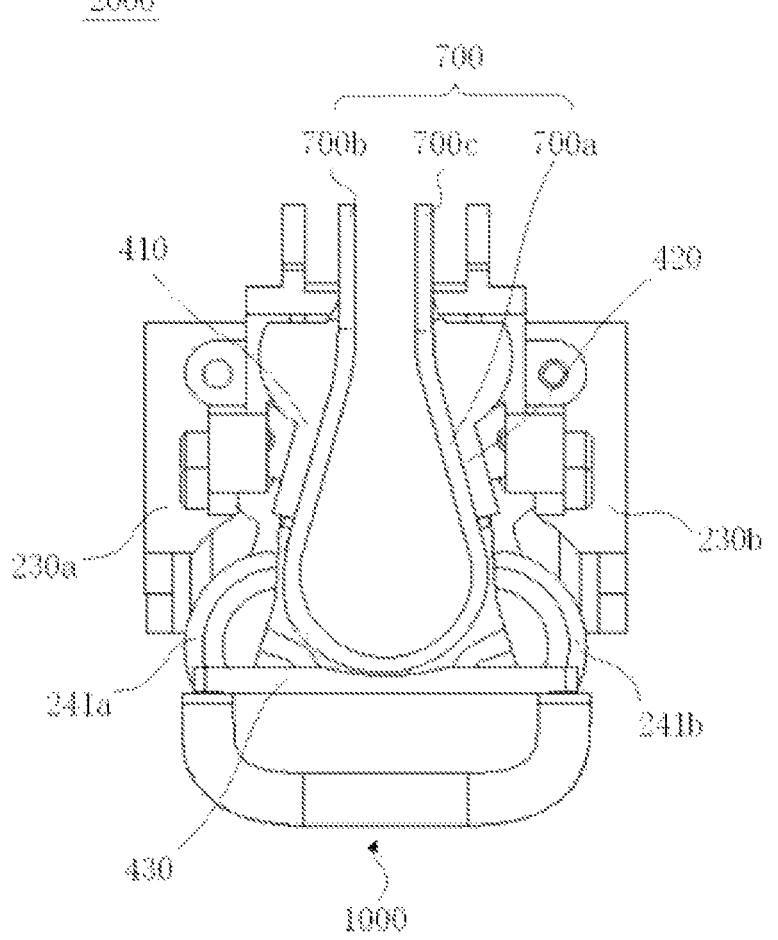
FIG. 8 is a schematic partial structural view of a foldable display device in a folded state according to an embodiment of the present disclosure.

As shown in FIG. 7 and FIG. 8, a foldable display device 2000 is further provided according to embodiments of the present disclosure. The foldable display device 2000 includes a flexible display panel 700 and at least one hinge 1000 mentioned in the preceding embodiments.

Specifically, the flexible display panel 700 includes a foldable flexible part 700a, a first part 700b, and a second part 700c, and the first part 700b and the second part 700c are connected to two opposite sides of the flexible part 700a.

It can be understood that, a number of the flexible parts 700a of the flexible display panel 700 and a number of the hinges 1000 are not limited according to the present disclosure. That the flexible display panel 700 has one flexible part 700a is taken as an example for illustration, and the number of the hinges 1000 is correspondingly one.

Specifically, the rotation mechanism 200 of the hinge 1000 includes at least one linear sliding module (referring to 210 in preceding embodiments for detail). For example, as shown in FIG. 9 to FIG. 11, the rotation mechanism 200 includes a first linear sliding module 210a and a second linear sliding module 210b located on two opposite sides of the fixed trestle 100 and having a same structure.

It can be understood that, a number of the linear sliding modules is not limited in the present disclosure. The first linear sliding module 210a and the second linear sliding module 210b are taken as an example for illustration according to embodiments of the present disclosure. Furthermore, the first linear sliding module 210a and the second linear sliding module 210b have the same structure with the linear sliding module 210 according to preceding embodiments.

Figure 9:
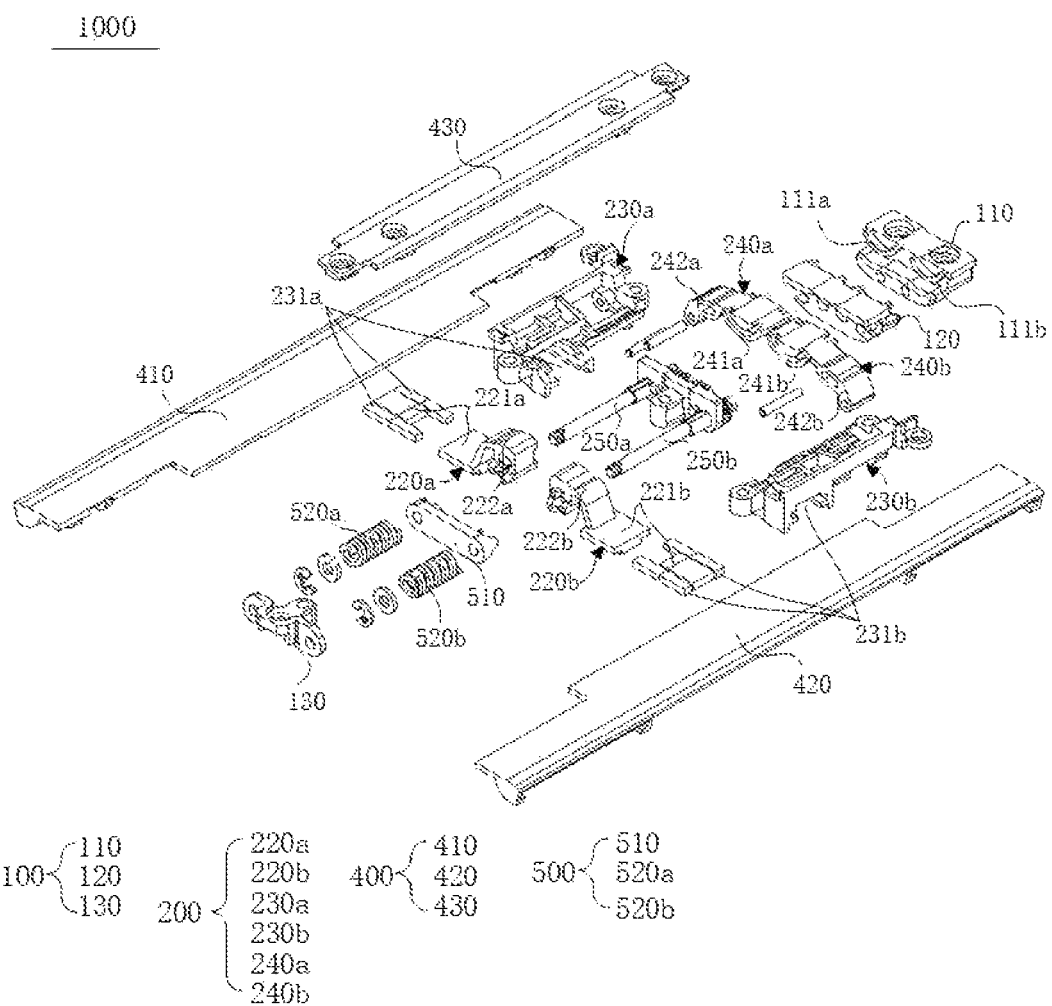
FIG. 9 is an exploded view of a hinge according to an embodiment of the present disclosure.
Figure 10:
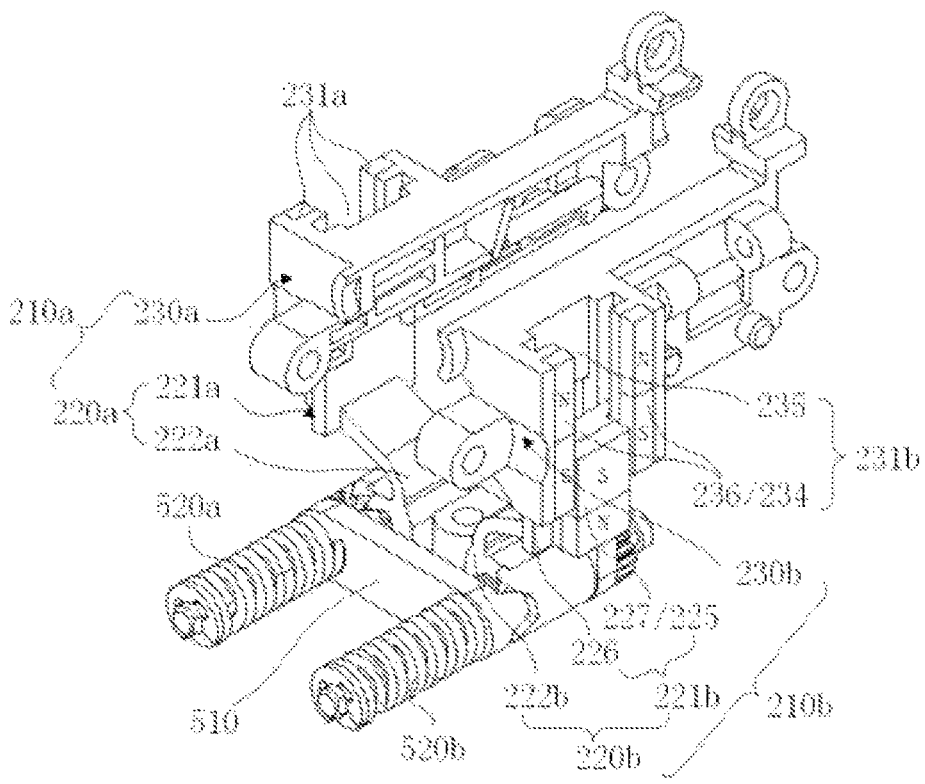
FIG. 10 is a schematic partial structural view of a hinge in a folded state according to an embodiment of the present disclosure.
Figure 11:
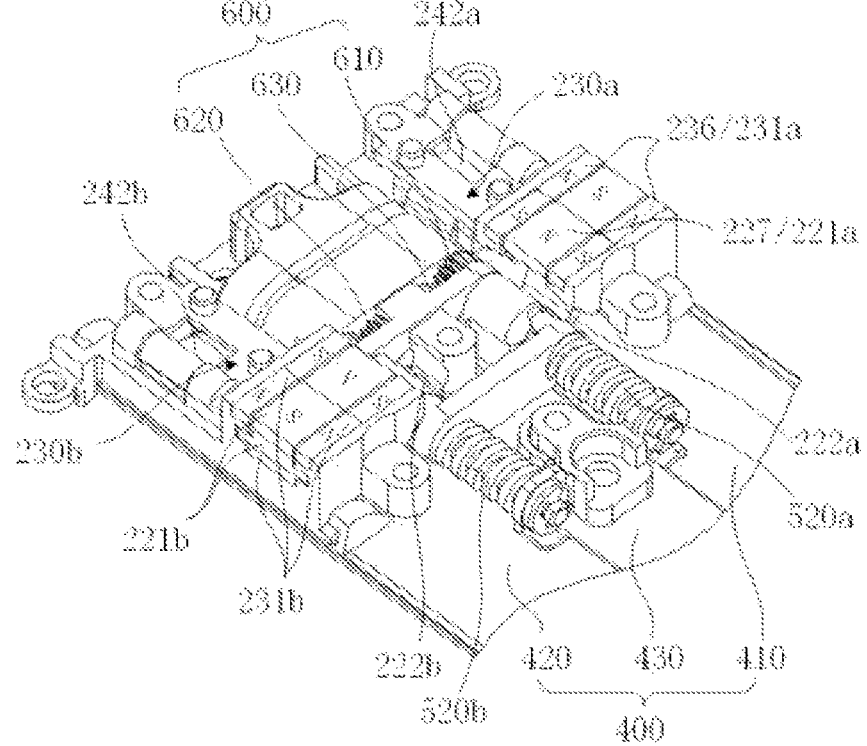
FIG. 11 is a schematic partial structural view of a hinge in an unfolded state according to an embodiment of the present disclosure.

For example, as shown in FIG. 9 to FIG. 11, the first linear sliding module 210a includes a first connection member 220a and a first installation member 230a. The second linear sliding module 210b includes a second connection member 220b and a second installation member 230b. An end of the first connection member 220a is rotationally connected to the fixed trestle 100 by coupled with the first shaft 250a, and another end of the first connection member 220a is connected to the first installation member 230a in a linearly slidable way. An end of the second connection member 220b is rotationally connected to the fixed trestle 100 by coupled with the second shaft 250b, and another end of the second connection member 220b is connected to the second installation member 230b in a linearly slidable way.

It should be noted that, the first shaft 250a and the second shaft 250b according to the embodiments may be virtual axis or entity shafts, and the entity shafts are taken as an example for illustration in the embodiments of the present disclosure.

Specifically, the first connection member 220a may be fixedly or flexibly connected to the first shaft 250a, and the second connection member 220b may be fixedly or flexibly connected to the second shaft 250b, they are not limited in the embodiments.

Specifically, as shown in FIG. 9 to FIG. 11, the first connection member 220a includes a first linear slider 221a a first extension part 222a extending along a direction from the first linear slider 221a towards the fixed trestle 100. The second connection member 220b includes a second linear slider 221b and a second extension part 222b extending along a direction from the second linear slider 221b towards the fixed trestle 100. The first installation member 230a is provided with a first linear chute 231a, and the second installation member 230b is provided with a second linear chute 231b. Herein, the first linear slider 221a is slidably connected to the first linear chute 231a, and the first extension part 222a is provided with a first hole (not shown in the figures) for the first shaft 250a to pass through. The second linear slider 221b is slidably connected to the second linear chute 231b, and the second extension part 222b is provided with a second hole (not shown in the figures) for the second shaft 250b to pass through.

It can be understood that, the first extension part 222a and the second extension part 222b each have a structure same with a structure of the extension part 222 shown in FIG. 5 or FIG. 6. In other words, the first hole is defined on the rotation part 2222 of the first extension part 222a, and the second hole is defined on the rotation part 2222 of the second extension part 222b. In addition, the first linear slider 221a and the second linear slider 221b each have a structure same with a structure of the linear slider 221 shown in FIG. 5 or FIG. 6. Accordingly, the first linear chute 231 and the second linear chute 231*b* each have a structure same with a structure of the linear chute 231 shown in FIG. 5 or FIG. 6.

When the hinge 1000 is in the folded state, the magnetic forces generated between the first magnetic member 227 and the second magnetic member 236 of the first linear sliding module 210*a* and the magnetic forces generated between the first magnetic member 227 and the second magnetic member 236 of the second linear sliding module 210*b* can hold the hinge 1000 in the folded state, thereby reducing the friction forces generated by the main damper of the hinge 1000, and then relieving wear degree of the main damper in repeated folding and unfolding processes.

During the changing process of the hinge 1000 from the folded state to the unfolded state, the magnetic forces generated between the first magnetic member 227 and the second magnetic member 236 of the first linear sliding module 210*a* and the magnetic forces generated between the first magnetic member 227 and the second magnetic member 236 of the second linear sliding module 210*b* each has a direction changing from a direction of holding the folded state to a direction of holding the unfolded state, thereby unfolding of the hinge 1000. In other words, the first linear sliding module 210*a* and the second linear sliding module 210*b* first provide the motion damping to the hinge 1000 for unfolding, and then provide the unfolding force to promote the hinge 1000 to unfold, so that the hinge 1000 can be automatically unfolded at the unfolding moment.

When the hinge 1000 is in the unfolded state, the magnetic forces generated between the first magnetic member 227 and the second magnetic member 236 of the first linear sliding module 210*a* and the magnetic forces generated between the first magnetic member 227 and the second magnetic member 236 of the second linear sliding module 210*b* are zero. In other words, at this moment, the repulsion forces and the suction forces generated between the first magnetic member 227 and the second magnetic member 236 are balanced. Since the retention force of holding the balance between the first magnetic member 227 and the second magnetic member 236 can correspondingly act on the first linear slider 221*a* and the first linear chute 231*a*, the hinge 1000 can be hold in the unfolded state.

During the changing process of the hinge 1000 from the unfolded state to the folded state, the magnetic forces generated between the first magnetic member 227 and the second magnetic member 236 of the first linear sliding module 210*a* and the magnetic forces generated between the first magnetic member 227 and the second magnetic member 236 of the second linear sliding module 210*b* each have a direction changing from a direction of holding the unfolded state to a direction of holding the folded state, so as to fold the hinge 1000. In other words, the first linear sliding module 210*a* and the second linear sliding module 210*b* first provide the motion damping to the hinge 1000 for folding, and then provide the folding force to promote the hinge 1000 to fold, so that the hinge 1000 can be automatically folded at the folding moment.

Specifically, as shown in FIG. 10 and FIG. 11, the first magnetic member 227 and the second magnetic member 236 may each be a bar magnet. A detailed description of the first magnetic member 227 and the second magnetic member 236 can be referred to the preceding embodiments, which is not repeated here.

Specifically, as shown in FIG. 9, the fixed trestle 100 includes a main support 110 and a first support 120. Herein, the first shaft 250*a* and the second shaft 250*b* are rotationally connected to the main support 110, and the first support 120 is sleeved on the first shaft 250*a* and the second shaft 250*b*.

Specifically, as shown in FIG. 9 and FIG. 11, the hinge 1000 further includes a support mechanism 400. The support mechanism 400 includes a first support member 410 and a second support member 420. The first support member 410 is rotationally connected to a side of the fixed trestle 100 by coupled with a third shaft (not shown in the figures), and the second support member 420 is rotationally connected to another side of the fixed trestle 100 by coupled with a fourth shaft (not shown in the figures).

It should be noted that, the first shaft 250*a* and the third shaft have different axis, and the second shaft 250*b* and the fourth shaft have different axis.

Of course, the support mechanism 400 may further include a third support member (not shown in the figures) flexibly connected to an end of the first support member 410 away from the fixed trestle 100 and a fourth support member (not shown in the figures) flexibly connected to an end of the second support member 420 away from the fixed trestle 100.

Specifically, the first installation member 230*a* is fixedly connected to the first support member 410, and the second installation member 230*b* is fixedly connected to the second support member 420. The first connection member 220*a* is slidably connected to the first support member 410 through the first installation member 230*a*. The second connection member 220*b* is slidably connected to the second support member 420 through the second installation member 230*b*.

It can be understood that, in the embodiments, the first installation member 230*a* and the first support member 410 may be an integrated structure, or may be fixed by a fixing member, and the second installation member 230*b* and the second support member 420 may be an integrated structure, or may be fixed by another fixing member, which are not further limited in the embodiments.

Specifically, as shown in FIG. 9, the main support 110 includes a first arc chute 111*a* and a second arc chute 111*b*. The rotation mechanism 200 further includes a third connection member 240*a* and a fourth connection member 240*b*. The third connection member 240*a* includes a first arc slider 241*a* and a third extension part 242*a* extending from an end of the first arc slider 241*a*. The fourth connection member 240*b* includes a second arc slider 241*b* and a fourth extension part 242*b* extending from an end of the second arc slider 241*b*. Herein, the first arc slider 241*a* and the second arc slider 241*b* are configured to rotate and slide respectively in the first arc chute 111*a* and the second arc chute 111*b*. The third extension part 242*a* is flexibly connected to the first installation member 230*a* through a combination of a dowel and a shaft, and the fourth extension part 242*b* is flexibly connected to the second installation member 230*b* through another combination of another dowel and another shaft.

Specifically, the first arc slider 241*a* and the second arc slider 241*b* each have a bottom shaped as an arc-structure. Herein, the first arc slider 241*a* is matched with the first arc chute 111*a*, and the second arc slider 241*b* is matched with the second arc chute 111*b*.

Since the first installation member 230*a* is fixedly connected to the first support member 410, and the second installation member 230*b* is fixedly connected to the second support member 420, relative positions of the first support member 410 and the second support member 420 change along with a change of relative positions of the first arc slider 241*a* and the second arc slider 241*b*.

As shown in FIG. 8, when the support mechanism 400 is in the folded state, the flexible part 700*a* is configured to be curved. The first support member 410 and the second support member 420 are configured to be oppositely arranged and respectively support two opposite ends of the flexible part 700a. The third support member and fourth support member are configured to be oppositely arranged and respectively support the first part 700b and the second part 700c of the flexible display panel 700.

Furthermore, when the support mechanism 400 is in the folded state, a distance between two opposite sides of the flexible part 700a gradually increases along a direction from the first support member 410 and the second support member 420 towards the fixed trestle 100, so that the flexible part 700a is curved as an arc (for example as a drop shape).

Specifically, as shown in FIG. 7 and FIG. 8, the support mechanism 400 further includes a fifth support member 430. Herein, the fifth support member 430 is flexibly connected to the fixed trestle 100, and the first support member 410 and the second support member 420 are located at both sides of the fifth support member 430, respectively.

When the support mechanism 400 is in the unfolded state, the first support member 410, the second support member 420, the third support member, the fourth support member, and the fifth support member 430 together define a planar surface. When the support mechanism 400 is in the folded state, the fifth support member 430 is configured to be adjacent to the fixed trestle 100.

Specifically, as shown in FIG. 9, the fixed trestle 100 further includes a second support 130. Herein, the second support 130 is sleeved on the first shaft 250a and the second shaft 250b.

Specifically, as shown in FIG. 9 and FIG. 10, the hinge 1000 further includes a position mechanism, and the position mechanism includes a position member 510. Herein, the position member 510 is sleeved on the first shaft 250a and the second shaft 250b and is disposed adjacent to the first extension part 222a and the second extension part 222b. each of an end of the first extension part 222a and an end of the second extension part 222b adjacent to the position member 510 is provided with the first cam 224 described in the preceding embodiments. The position member 510 includes two second cams abutted against the first cam of the first extension part 222a and the first cam of the second extension part 222b, respectively. Specifically, structures of the first cams and the second cams can be referred to the illustration of the first cam 224 and the second cam 511 in preceding embodiments.

Specifically, as shown in FIG. 9 and FIG. 10, the position mechanism further includes a first elastic member 520a and a second elastic member 520b. Herein, the first elastic member 520a is sleeved on the first shaft 250a, an end of the first elastic member 520a is connected to the position member 510, and another end of the first elastic member 520a is connected to the second support 130. The second elastic member 520b is sleeved on the second shaft 250b, an end of the second elastic member 520b is connected to the position member 510, and another end of the second elastic member 520b is connected to the second support 130. When the support mechanism 400 is in the folded state or the unfolded state, the first elastic member 520a and the second elastic member 520b are configured to be in an elastic deformation state.

It should be noted that, the first elastic member 520a and the second elastic member 520b may each be a spring, but not limited.

As stated in the preceding embodiments, the first cam, the second cam, and the elastic member form the main damper of the hinge 1000. During the unfolding process or the folding process of the hinge 1000, the motion damping is provided by the friction forces between the first cam and the second cam. When the hinge 1000 is in the unfolded state or the folded state, the retention force of unfolding or folding is provided by the friction forces between the first cam and the second cam.

Specifically, as shown in FIG. 11, the hinge 1000 further includes a synchro-mechanism 600. The synchro-mechanism 600 includes a first synchronous member 610, a second synchronous member 620, and a third synchronous member 630. The first synchronous member 610 is connected to the first shaft 250a, the second synchronous member 620 is connected to the second shaft 250b, and the first synchronous member 610 is synchronously connected to the second synchronous member 620 through the third synchronous member 630, so that the first shaft 250a and the second shaft 250b are rotated synchronously.

Specifically, the synchro-mechanism 600, the rotation mechanism 200, and the position mechanism are matched. The first support member 410 and the second support member 420 are driven by the synchro-mechanism 600 and the rotation mechanism 200 to synchronously rotate relative to the fixed trestle 100, respectively. So that consistency and stability of movements of the first support member 410 and the second support member 420 are improved, and the stability of the hinge 1000 is further enhanced.

Furthermore, the first arc slider 241a and the second arc slider 241b can be driven by the synchro-mechanism 600 and the rotation mechanism 200 to rotate respectively relative to the first arc chute 111a and the second arc chute 111b of the main support 110, and the first linear slider 221a and the second linear slider 221b can be driven by the synchro-mechanism 600 and the rotation mechanism 200 to slide respectively relative to the first linear chute 231a and the second linear chute 231b, thereby changing states of the hinge 1000.

Specifically, the first synchronous member 610 includes a first gear, the second synchronous member 620 includes a second gear, and the third synchronous member 630 includes two third gears meshed with each other. Herein, the two third gears are rotationally connected to the main support 110 and the first support 120, the first gear is sleeved on the first shaft 250a, the second gear is sleeved on the second shaft 250b, the first gear is meshed with one of the two third gears, and the second gear is meshed with the other one of the two third gears.

According to the embodiment of the present disclosure, when the hinge 1000 is unfolded, the first linear sliding module 210a and the second linear sliding module 210b can each provide the magnetic force to the hinge 1000 for holding the unfold state. When the hinge 1000 is folded, the first linear sliding module 210a and the second linear sliding module 210b can each provide the retention force to the hinge 1000 for holding the folded state. During the unfolding process of the hinge 1000, the first linear sliding module 210a and the second linear sliding module 210b first provide an unfolding damping and then provide the unfolding force to the hinge 1000, so that the hinge 1000 can be automatically unfolded at the unfolding moment. During the folding process of the hinge 1000, the first linear sliding module 210a and the second linear sliding module 210b first provide a folding damping and then provide the unfolding force to the hinge 1000, so that the hinge 1000 can be automatically folded at the folding moment.

Therefore, the first linear sliding module 210a and the second linear sliding module 210b can compensate the motion damping required in the unfolding process and the folding process of the hinge 1000 and compensate the retention forces required in the folded state and the unfolded state of the hinge 1000, so as to reduce the friction forces generated by the main damper of the hinge 1000 and then relieve wear degree of the main damper in repeated folding and unfolding processes, thereby enhancing the stability and the service life of the hinge 1000. In addition, the magnetic forces provide by the first linear sliding module 210a and the second linear sliding module 210b are non-contact forces, so as to avoid direct mechanical contacts, thereby preventing from further wearing due to friction forces, then enhancing stability of the hinge 1000 in long-term use, and then enhancing the service life of the foldable display device 2000.

An electronic terminal is further provided according to embodiments of the present disclosure. The electronic terminal includes the foldable display device as described in the preceding embodiments. Herein, the foldable display device has been illustrated in detail in the preceding embodiments and will not be repeated here.

The embodiment further provides a hinge described in the foldable display device. Herein, the structure of hinge has been illustrated in detail in the preceding embodiment, which is not repeated here.

In the above embodiments, the description of each embodiment has its own emphasis. For the part not detailed in one embodiment, please refer to the relevant description of other embodiments.

The hinges and the foldable display devices according to some embodiments of the present disclosure have been described above in detail. The illustration of the above embodiments is intended only to assist in understanding the technical solutions and core ideas of the present disclosure. Those skilled in the art can make various changes and modifications without departing from the spirit of the present disclosure. Therefore, the illustration of the specification is not intended to limit the present disclosure.

The invention claimed is:

1. A hinge, comprising a fixed trestle and a rotation mechanism; wherein the rotation mechanism comprises at least one linear sliding module, the linear sliding module comprises a connection member and an installation member, the connection member comprises a linear slider and an extension part extending along a direction from the linear slider to the fixed trestle, and the installation member is provided with a linear chute thereon, the linear slider is slidably connected to the linear chute, and the extension part is rotationally connected to the fixed trestle; and wherein the linear slider comprises a first magnetic area with a first magnetic member; the linear chute comprises a second magnetic area with a second magnetic member adjacent to the first magnetic area; and the first magnetic member and the second magnetic member have opposite magnetic field directions parallel to a sliding direction of the linear slider; and the second magnetic member comprises portions at two sides of the first magnetic member;

wherein during a movement of the hinge, the linear slider slides within the linear chute, the first and second magnetic members attract in a first portion of the movement, and repel in a second portion of the movement;

wherein the linear slider comprises a sliding part connected to the extension part, the first magnetic member is fixed on the sliding part; the linear chute comprises a chute part disposed on the installation member, the second magnetic member is fixed on the chute part; and the sliding part is slidably connected to the chute part;

wherein the first magnetic member comprises a first bar magnet, the second magnetic member comprises a second bar magnet and a third bar magnet symmetrically disposed on both sides of the chute part and having a same pole direction, and the first bar magnet, the second bar magnet, and the third bar magnet each have an extending direction same with an extending direction of the chute part.

2. The hinge according to claim 1, wherein the second portion of the movement comprises a first unfolding phase, and the first portion of the movement comprises a second unfolding phase;

during first unfolding phase, a repulsive force exerting on the first magnetic member by the second magnetic member is toward the fixed trestle and the first magnetic member slides away from the fixed trestle; and during the second unfolding phase, a suction force exerting on the first magnetic member by the second magnetic member is away from the fixed trestle and the first magnetic member slides away from the fixed trestle, until the the first magnetic member is farthest from the fixed trestle to enable the hinge being in a unfolded state.

3. The hinge according to claim 2, wherein when the hinge is in the unfolded state, the first bar magnet, the second bar magnet and the third bar magnet are arranged side by side, and two magnetic poles of the first bar magnet are opposite to two magnetic poles of each of the second bar magnet and the third bar magnet.

4. The hinge according to claim 2, wherein the first portion of the movement comprises a first folding phase, and the second portion of the movement comprises a second folding phase;

wherein during the first folding phase another suction force exerting on the first magnetic member by the second magnetic member is away from the fixed trestle, and the first magnetic member slides towards the fixed trestle; and during the second folding phase another repulsive force exerting on the first magnetic member by the second magnetic member is towards the fixed trestle, and the first magnetic member slides towards the fixed trestle.

5. The hinge according to claim 4, wherein when the hinge is in a folded state, the magnetic force acting on the first magnetic area has a direction configured to be towards the fixed trestle.

6. The hinge according to claim 1, wherein a distance between the first magnetic member and the second magnetic member is greater than zero.

7. The hinge according to claim 1, wherein the first magnetic member is fixed on a side of the sliding part away from the chute part in a direction perpendicular to the linear slider and the linear chute, and the second magnetic member is arranged along an extending direction of the chute part and is adjacent to the first magnetic member.

8. The hinge according to claim 1, wherein a length of the first bar magnet is less than or equal to a length of the chute part, and a length of the second bar magnet and a length of the third bar magnet are equal to the length of the chute part.

9. The hinge according to claim 8, wherein when the hinge is in a folded state, a distance between an end of the first bar magnet away from the extension part and a magnetic pole interface of the second bar magnet and a distance between the end of the first bar magnet away from the extension part and a magnetic pole interface of the third bar magnet are configured to be greater than zero.

10. The hinge according to claim 8, wherein when the hinge is in an unfolded state, a magnetic pole interface of the first bar magnet, a magnetic pole interface of the second bar magnet, and a magnetic pole interface of the third bar magnet are configured to be linearly arranged in a direction perpendicular to the extending direction of each of the first bar magnet, the second bar magnet and the third bar magnet.

11. The hinge according to claim 1, wherein the chute part comprises a first limiting chute, a second limiting chute, and a guiding chute; an opening of the first limiting chute and an opening of the second limiting chute are configured to face each other, and the guiding chute is located between the first limiting chute and the second limiting chute and is communicated with the first limiting chute and the second limiting chute; and the sliding part comprises a sliding body located in the first limiting chute, the second limiting chute, and the guiding chute; and wherein the first bar magnet is disposed on a side of the sliding body away from the guiding chute and corresponds to the guiding chute, the second bar magnet is disposed on an outer surface of a lateral wall of the first limiting chute, and the third bar magnet is disposed on an outer surface of a lateral wall of the second limiting chute.

12. The hinge according to claim 11, wherein in the direction perpendicular to the linear slider and the linear chute, the sliding part further comprises a protrude part located on a side of the sliding body away from the guiding chute and corresponds to the guiding chute, and the first bar magnet is located on a side of the protrude part away from the sliding body.

13. The hinge according to claim 11, wherein the installation member further comprises a first limiting plate located on an outer surface of a bottom wall of the first limiting chute and protruding along a direction perpendicular to the installation member and a second limiting plate located on an outer surface of a bottom wall of the second limiting chute and protruding along the direction perpendicular to the installation member, and an extending direction of the first limiting plate and an extending direction of the second limiting plate are same with an extending direction of the guiding chute; and wherein a side of the second bar magnet away from the third bar magnet is in contact with the first limiting plate, and a side of the third bar magnet away from the second bar magnet is in contact with the second limiting plate.

14. The hinge according to claim 4, wherein the extension part comprises a connection part and a rotation part, the connection part comprises an end connected to the linear slider and another end connected to the rotation part, and the rotation part is rotationally connected to the fixed trestle through a shaft;

wherein the hinge further comprises a position mechanism, the position mechanism comprises a position member and an elastic member each sleeved on the shaft, the elastic member comprises an end connected to the position member and another end connected to the fixed trestle, and the position member is located between the elastic member and the rotation part; and wherein an end of the rotation part adjacent to the position member is provided with a first cam, the position member comprises a second cam abutting against with the first cam, and the first cam and the second cam are sleeved on the shaft.

15. The hinge according to claim 14, wherein when the hinge is in a folded state or the unfolded state, the elastic member is configured to be compressed, and the first cam and the second cam are configured to generate friction forces therebetween and interacting on each other;

wherein when the hinge is in the folded state, the first cam and the second cam are configured to generate the friction forces therebetween to hold the hinge in the folded state, and the first magnetic area and the second magnetic area are configured to generate the magnetic forces therebetween to hold the hinge in the folded state; and when the hinge is in the unfolded state, the first cam and the second cam are configured to generate the friction forces therebetween to hold the hinge in the unfolded state, and the first magnetic area and the second magnetic area are configured to generate the magnetic forces therebetween to hold the hinge in the unfolded state.

16. The hinge according to claim 14, wherein the elastic member is configured to be compressed, and the first cam and the second cam are configured to generate a friction force therebetween and having a direction opposite to a rotation direction of the first cam, so as to provide a motion damping to the hinge;

wherein when the hinge is during the first folding phase and the first unfolding phase, the first magnetic area and the second magnetic area are configured to generate the magnetic forces therebetween and each having the direction opposite to the sliding direction of the linear slider, so as to provide the motion damping to the hinge.

17. A foldable display device, comprising a flexible display panel and at least one hinge comprising a fixed trestle, a rotation mechanism, and a support mechanism;

wherein the rotation mechanism comprises two linear sliding modules located respectively on two opposite sides of the fixed trestle, each of the linear sliding modules comprises a connection member and an installation member, the connection member comprises a linear slider and an extension part extending along a direction from the linear slider to the fixed trestle, and the installation member is provided with a linear chute thereon, the linear slider is slidably connected to the linear chute, and the extension part is rotationally connected to the fixed trestle;

wherein the linear slider comprises a first magnetic area with a first magnetic member; the linear chute comprises a second magnetic area with a second magnetic member adjacent to the first magnetic area; and the first magnetic member and the second magnetic member have opposite magnetic field directions parallel to a sliding direction of the linear slider; and the second magnetic member comprises portions at two sides of the first magnetic member;

wherein during a movement of the hinge, the linear slider slides within the linear chute, the first and second magnetic members attract in a first portion of the movement, and repel in a second portion of the movement;

wherein the linear slider comprises a sliding part connected to the extension part, the first magnetic member is fixed on the sliding part; the linear chute comprises a chute part disposed on the installation member, the second magnetic member is fixed on the chute part; and the sliding part is slidably connected to the chute part;

wherein the first magnetic member comprises a first bar magnet, the second magnetic member comprises a second bar magnet and a third bar magnet symmetrically disposed on both sides of the chute part and having a same pole direction, and the first bar magnet, the second bar magnet, and the third bar magnet each have an extending direction same with an extending direction of the chute part;

wherein the at least one linear sliding module comprises two linear sliding modules located respectively on two opposite sides of the fixed trestle;

wherein the hinge further comprises a support mechanism, the support mechanism comprises a first support member and a second support member, the first support member is fixedly connected to the installation member of one of the linear sliding modules, and the second support member is fixedly connected to the installation member of the other one the linear sliding modules; and wherein when the hinge in an unfolded state, the first support member and the second support member are configured to be relatively unfolded, the flexible display panel is configured to be unfolded and located on the first support member and the second support member; and when the hinge in a folded state, the first support member and the second support member are configured to be relatively folded, the flexible display panel is configured to be folded and located between the first support member and the second support member.

\* \* \* \* \*